US011226937B2

(12) United States Patent
Zweigle et al.

(10) Patent No.: US 11,226,937 B2
(45) Date of Patent: Jan. 18, 2022

(54) DISTRIBUTED MEASUREMENT SYSTEM FOR SCANNING PROJECTS

(71) Applicant: FARO Technologies, Inc., Lake Mary, FL (US)

(72) Inventors: Oliver Zweigle, Stuttgart (DE); Ahmad Ramadneh, Kornwestheim (DE); Aleksej Frank, Stuttgart (DE); Joao Santos, Kornwestheim (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 378 days.

(21) Appl. No.: 16/360,509

(22) Filed: Mar. 21, 2019

(65) Prior Publication Data

US 2020/0301885 A1    Sep. 24, 2020

(51) Int. Cl.
| | |
|---|---|
| *G06F 16/176* | (2019.01) |
| *G06F 16/13* | (2019.01) |
| *G06F 3/0482* | (2013.01) |
| *G06F 3/0484* | (2013.01) |
| *G06F 40/166* | (2020.01) |

(52) U.S. Cl.
CPC .......... *G06F 16/176* (2019.01); *G06F 3/0482* (2013.01); *G06F 3/0484* (2013.01); *G06F 16/13* (2019.01); *G06F 40/166* (2020.01)

(58) Field of Classification Search
CPC ...... G06F 16/909; G06F 16/176; G06F 16/13; G06F 40/166; G06F 3/0482; G06F 3/0484
See application file for complete search history.

(56) References Cited

U.S. PATENT DOCUMENTS

| 8,705,012 | B2 | 4/2014 | Greiner et al. | |
| 2013/0104410 | A1* | 5/2013 | Wade | G01C 21/00 33/361 |
| 2017/0132768 | A1* | 5/2017 | Bedi | H04L 67/36 |
| 2017/0249763 | A1* | 8/2017 | Garvey | G06T 11/001 |
| 2019/0012621 | A1* | 1/2019 | Kudo | G06Q 10/0633 |

* cited by examiner

*Primary Examiner* — Kris E Mackes
(74) *Attorney, Agent, or Firm* — Cantor Colburn LLP

(57) ABSTRACT

A system and method for providing a distributed measurement system. The system performs operations that include receiving, via a user interface of a user device, a request to access a data file of a project. The project includes one or more data files including the data file, and at least one of the one or more data files is generated based at least in part on measurement data output from a measurement device. One or more editing options are provided for editing the data file. The one or more editing options vary based at least in part on one or both of a characteristic of the user device and a characteristic of the data file. The data file is edited in response to receiving an editing request that includes an editing option of the one or more editing options.

18 Claims, 17 Drawing Sheets

DISTRIBUTED MEASUREMENT SYSTEM FOR SCANNING PROJECTS

BACKGROUND

The present application relates generally to scanning projects, and more specifically to a distributed measurement system for scanning projects.

Two-dimensional (2D) and three-dimensional (3D) scanners are used to make digital measurements or copies of real world objects. For example, the automated creation of digital 2D floorplans for existing structures is desirable as it allows the size and shape of the environment to be used in many processes. A 2D floorplan may be utilized to allow construction drawings to be prepared during a renovation. Such floorplans may find other uses such as documenting a building for a fire department or documenting a crime scene. Scan data representing the floorplans can be captured using a scanner, such as a FARO® ScanPlan device manufactured by FARO Technologies Inc. of Lake Mary, Fla. The captured scan data can then be stored, often along with other project data, as one or more projects.

In order to visualize a stored project, a user must have access to the scanner that generated the scan data, or have network access to a cloud based storage location of the project data and a corresponding visualization application for execution on a cloud based processor. For example, when a scanner such as a FARO ScanPlan device is used to create the scan data of a project, the user must connect a user device, such as a smartphone, to the scanner to visualize the project. Alternatively, when the project has been stored in a cloud based storage location, in order to access the stored project the user connects to the Internet using a user device as a user interface to the corresponding visualization application executing on the cloud based processor.

In many situations a user desiring to visualize a stored project does not have Internet access nor does the user have a scanner device to connect to the user's user device. In addition, even though the user is not collecting additional scan data, the scanner device itself is used to open the project and to check information stored in the project (e.g., the measurements). These situations might happen, for example, when the user is visiting a previously scanned area, such as a building, and wants to access the stored project to add new notes or new photographs. Having to carry a scanner for such tasks or utilize Internet access is not always convenient.

Accordingly, while existing manners of accessing project data are suitable for their intended purposes, what is needed is a system for having certain features of embodiments of the present invention.

BRIEF DESCRIPTION

According to an embodiment of the present invention, a system for providing a distributed measurement system is provided. The system includes a memory having computer readable instructions and one or more processors for executing the computer readable instructions. The computer readable instructions control the one or more processors to perform operations that include receiving, via a user interface of a user device, a request to access a data file of a project. The project includes one or more data files including the data file, and at least one of the one or more data files is generated based at least in part on measurement data output from a measurement device. One or more editing options are provided for editing the data file. The one or more editing options vary based at least in part on one or both of a characteristic of the user device and a characteristic of the data file. The data file is edited in response to receiving an editing request that includes an editing option of the one or more editing options.

In addition to one or more of the features described herein, or as an alternative, further embodiments of the system may include that the measurement device includes a scanner and the measurement data includes scan data.

In addition to one or more of the features described herein, or as an alternative, further embodiments of the system may include that the data file includes a density of the data file.

In addition to one or more of the features described herein, or as an alternative, further embodiments of the system may include that the editing options further vary based at least in part on a location of a processor executing an application performing the receiving, providing and editing.

In addition to one or more of the features described herein, or as an alternative, further embodiments of the system may include that the operations further include retrieving the data file and displaying contents of the data file via the user interface.

In addition to one or more of the features described herein, or as an alternative, further embodiments of the system may include that the operations further include storing the data file in a storage location on the user device.

In addition to one or more of the features described herein, or as an alternative, further embodiments of the system may include that the operations further include storing the data file in a cloud storage location.

In addition to one or more of the features described herein, or as an alternative, further embodiments of the system may include that the operations further include transmitting the data file to another user device.

In addition to one or more of the features described herein, or as an alternative, further embodiments of the system may include that the user device includes a camera and the editing option includes adding an image to the data file.

In addition to one or more of the features described herein, or as an alternative, further embodiments of the system may include that the user device includes an inertial measurement unit, and the editing option includes identifying a position of the user device.

Other embodiments of the present invention implement the features of the above described systems in methods and in computer program products.

Technical effects of embodiments of the present disclosure include providing a distributed measurement system for scan project data that allows device independent access to scan project data. This removes the requirement that a scanner or network connection be available in order to access a data file in a scan project.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
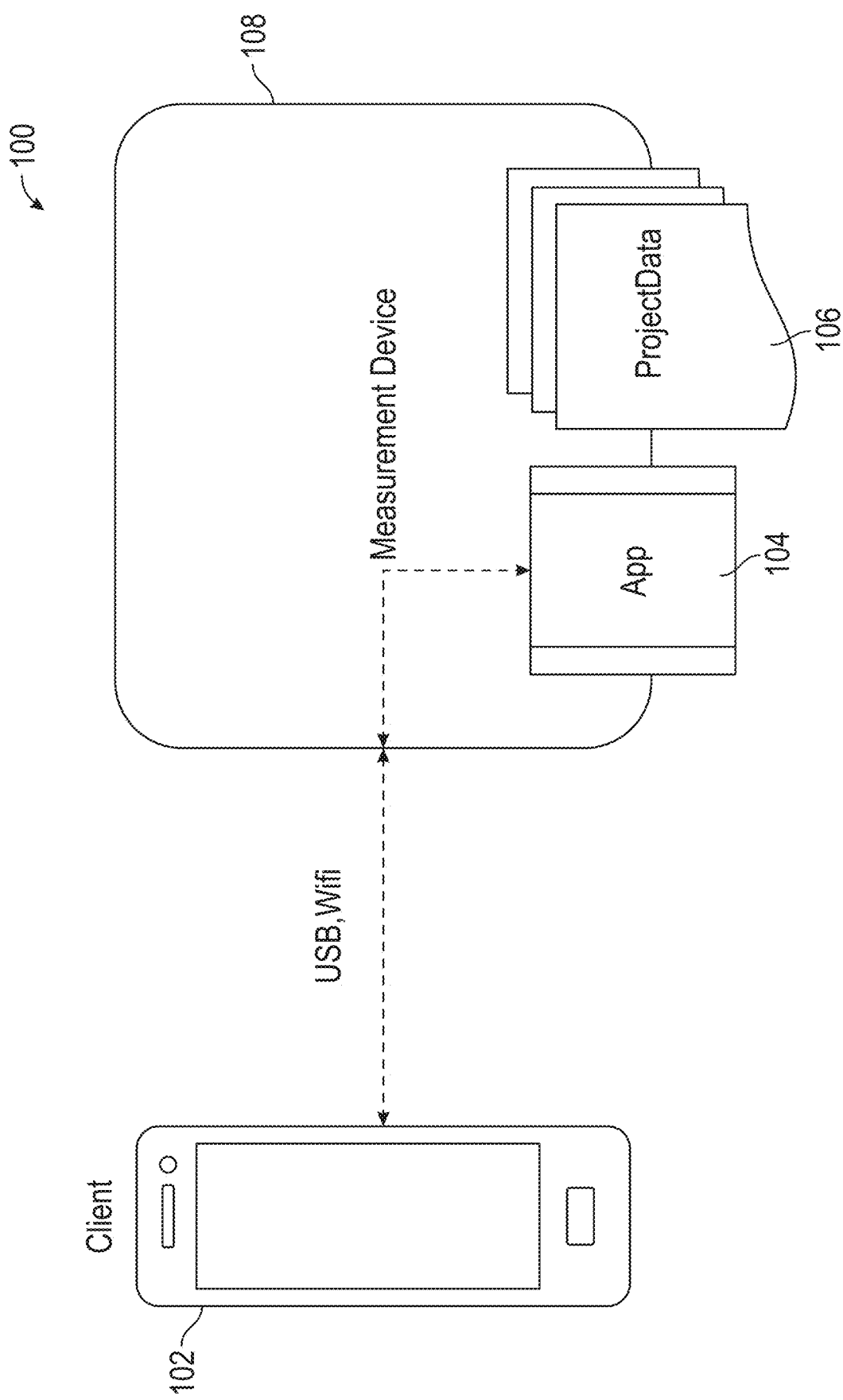
FIG. 1 is a schematic illustration of a measurement system for accessing project data using a contemporary application executing on a measurement device.

The detailed description explains embodiments of the invention, together with advantages and features, by way of example with reference to the drawings.

DETAILED DESCRIPTION

One or more embodiments of the present invention relate to a distributed measurement system that allows users to access (e.g., for viewing, editing, sharing, etc.) scan or other measurement projects without requiring the use of specific hardware. In accordance with one or more embodiments of the present invention, an application to access project data is available not only to measurement devices such as scanners but also to user devices such as smartphones.

As used herein the term "device independent visualization application" or "visualization application" refers to a native application that can be installed on user devices such as Android™, IOS®, and/or Windows® smartphones and/or to a mobile application that is accessible at a website by any user device having an Internet browser installed. In accordance with one or more embodiments of the present invention, the visualization application is used to access project data. In accordance with one or more embodiments of the present invention, the visualization application can provide different levels of functionality based, for example, on characteristics of the type of user device that is using the visualization application. For example, different smartphones may have different sensors and a smartphone having a camera may be able to add photographs to a project using the visualization application, and a smartphone having an inertial measurement unit (IMU) may be able to identify a position, or location, of the smartphone using the visualization application.

Not all the post-processing tools or functions of the visualization application are available on all types of user devices. For example, applying noise reducing algorithms or selecting only part of a dense point cloud may be difficult or even impossible to perform on a smartphone. In addition, access permissions of the dataset may impact the data that is accessible by a user. For example, certain elements of the project data may be characterized as private and/or be encrypted, thereby making them available to only a certain group of users. Further, communication functionalities can also impact functions that the visualization application can perform. If a user device allows Internet connectivity and consequently access to remote servers, the visualization application may be able to allow sharing of data with other similar devices, and/or other functions requiring access to data on remote servers.

In addition, in accordance with one or more embodiments of the present invention, the visualization application can provide different levels of functionality based on characteristics of the project data such as, but not limited to, the density of a dataset included in the project data. In accordance with one or more embodiments of the present invention, less functionality is provided for dense datasets (e.g., a full point cloud which includes a set of several scans) than for sparse datasets. In the case of dense datasets, an application having access to the dense dataset may have the ability to register the set of scans. In the case where a data set is a sparse dataset, the application can allow the visualization of the raw data or even a "lighter" visualization of it.

As used herein, the term "project data" includes, but is not limited to data files that store: raw scan data, post-processed scan data, photographs, measurements, and/or notes. A project is made up of, or includes, project data related to a particular scan or group of scans.

Further, in accordance with one or more embodiments of the present invention, the visualization application can provide different levels of functionality based on whether the user device is operating in a stand-alone mode or is connected to the cloud. In general, more functions may be provided by a visualization application characterized as executing on the cloud when compared to a visualization application characterized as executing on a stand-alone user device.

Turning now to FIG. 1, a schematic illustration of a measurement system 100 for accessing project data using a contemporary visualization application executing on a measurement device is generally shown. The measurement system 100 shown in FIG. 1 includes a user device 102, a measurement device 108, a contemporary visualization application 104, and project data 106. The contemporary visualization application 104 shown in FIG. 1 is executing on measurement device 108 which may, for example, be implemented by a scanner. Also shown in FIG. 1, is project data 106 stored on the measurement device 108. The user device 102 and the measurement device 108 can be in communication via any wireless or wired communication protocol known in the art. As shown in FIG. 1, the user device 102 and the measurement device 108 communicate via a Universal Serial Bus (USB) interface and/or via WiFi®.

The user device 102 shown in FIG. 1 can be implemented by any mobile or stationary computer device known in the art such as, but not limited to: a smartphone, a laptop computer, and a desktop computer.

The measurement device 108 can be implemented by any measurement device capable of measuring and determining two-dimensional (2D) or three-dimensional (3D) coordinates of an object or environment. The measurement device 108 may be implemented by, but is not limited to: an articulated arm coordinate measurement machine, a laser tracker, an image scanner, a photogrammetry device, a triangulation scanner, a laser line probe, 2D LIDAR device, 3D camera, a high precision scanner, and/or a structured light scanner.

For example, the measurement device 108 may be implemented by a FARO® ScanPlan device which can be used to quickly build and document floor plans, and the user device 102 may be implemented by a smartphone. The user can plug the smartphone into the FARO ScanPlan device or can connect the smartphone to the FARO ScanPlan device via a wireless local area network (WLAN). The combination of the smartphone and the FARO ScanPlan can be used in conjunction with the contemporary visualization application 104 to scan any indoor environment, to make measurements, to add annotations, etc. However, in contemporary implementations such as that shown in FIG. 1, in order to have access to the project data 106 without the FARO ScanPlan device, the user must manually export the project to a USB drive or to a storage location remote from the smartphone, such as a cloud based storage location. Thus, in the measurement system 100 of FIG. 1, the measurement device 108 acts as a server for the contemporary visualization application 104, while the user device 102 acts as a client that allows the user to access the contemporary visualization application 104 executing on the measurement device 108.

One or more embodiments of the present invention remove the requirement imposed by contemporary visualization applications that a user has a connection to a measurement device or to the Internet in order access a scan project. In accordance with one or more embodiments of the present invention, the user has access to the original data and also to the data relative to the sensor used to acquire the original data. This is similar to files in a RAW file format in digital single lens reflex (DSLR) cameras, which provide all of the information about the sensor and the different post processing parameters depending on the hardware used. For example, in the case of the FARO Focus, the post processing steps made in FARO Scene take into account the hardware specifications of the model of the FARO Focus used. Not all of the FARO Focus models have the same maximum range, resolution accuracy, etc., and thus the application must have access to those parameters in order to be able to display the data properly and to allow post-processing functions. In accordance with one or more embodiments of the present invention, a user can access a project directly on the user's user device without an Internet connection and without a measurement device. This provides more flexibility to the user in terms of devices that can be used to access data files contained in a project.

One or more embodiments of the present invention provide a decentralized approach, where a visualization application is available not only on the measurement device itself as shown in FIG. 1, but also on the user device (e.g., a mobile device) that connects to the measurement device or even in the cloud. The visualization application can provide different options depending on the situation and on the functionalities of the user device. Different situations include, but are not limited to: whether the user device is executing in a stand-alone mode or in conjunction with a processor accessed via the cloud.

Figure 2:
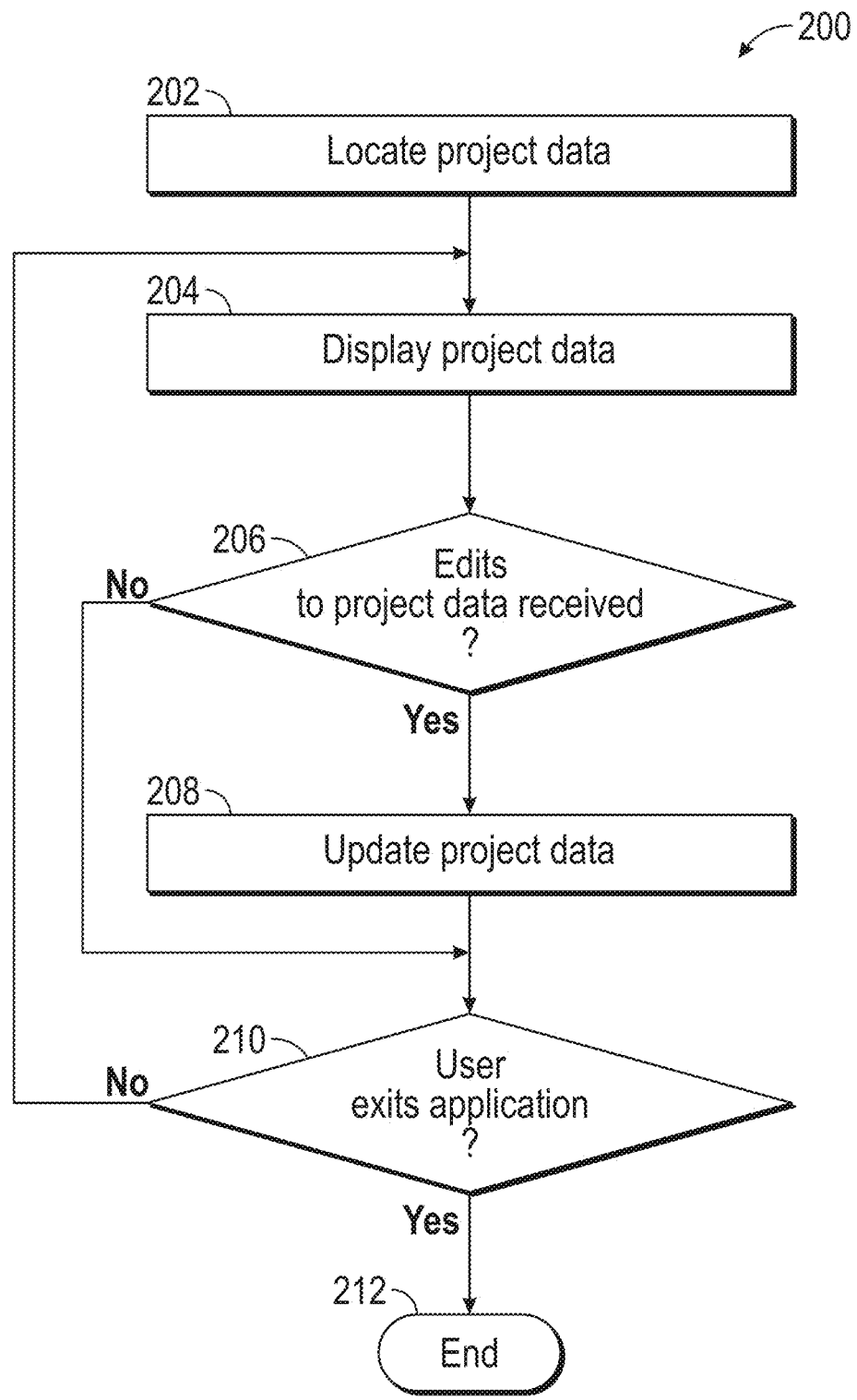
FIG. 2 is a flow diagram of a process for accessing project data in accordance with one or more embodiments of the present invention.

Turning now to FIG. 2, a flow diagram 200 of a process for accessing project data is generally shown in accordance with one or more embodiments of the present invention. All or a portion of the processing shown in FIG. 2 can be performed by an application executing on a processor located on a user device such as user device 302 of FIG. 3 or user device 402 of FIG. 4. In accordance with one or more embodiments of the present invention, the application is implemented by a device independent visualization application, such as visualization application 304 of FIG. 3 or visualization application 404 of FIG. 4, executing on a user device or a measurement device.

At block 202, project data (stored in a data file) requested by a user via a user interface of the user device is located. The project data may be located based, for example, on a name of the project containing the project data and/or on a storage location of the project data. The project data may be stored on the user device or in a storage location remote from the user device such as cloud storage. In accordance with one or more embodiments of the present invention, the project documents a floorplan of a building and each of the project data, or data files, include a 2D floorplan of a floor in the building annotated with any notes, measurements, photographs, etc. At block 204, the project data is displayed via the user interface of the user device. In accordance with one or more embodiments of the present invention, the way or manner in which the project data is displayed varies depending on characteristics of the user device. For example, the size and resolution of a display providing a user interface to the user device will influence the way that the content of the project data appears on the user device.

In a user device with an Internet connection, the application can automatically show location-based information that complements the project dataset. For example, in the same way that FARO Focus is shown in the FARO WebShare Cloud, the datasets can be shown geo-located. Also, if the device supports augmented reality functions, the visualization application can provide a walkthrough over the project data. In addition, if the device supports speech recognition, the user can control the visualization through voice commands.

The file type also influences the visualization, for example, the scans acquired with a FARO Focus are made of the scans themselves and panoramic photos. Those files can be accessed together on a computer with a powerful enough CPU or the files can be accessed individually in a smartphone. Generally, accesses to the different panoramic images is not a challenge (both visualization and interaction), however accesses to the 3D data can be a challenge. For example, the 3D data can be partially visualized and in some cases the user can even select points or even create bounding boxes on the relevant parts of the data, but typically the user cannot move freely over the data and have a general overview like on the computer. In accordance with one or more embodiments of the present invention, editing options are also displayed, for example via a user interface of the user device, at block 204. Editing options can include adding, removing or altering annotations such as, but not limited to: an image (e.g., a photograph), a measurement (e.g., between two points), a geographic location, and/or a note. Additional editing options can include, but are not limited to clipping the measurement data (e.g., 2D floorplan scan data) to focus on a specific geographic area or copying the measurement data into a new data file.

In accordance with one or more embodiments of the present invention, the editing options that are provided to a user of the user device vary based on the characteristics of the user device and/or characteristics of the data file, or the project data. Display size and resolution can play a big role on visualization of the data, especially 3D data. However, the way the user can interact with the data also relies on the input interfaces on the user device. For example, a smartphone typically has a touch interface and the functions to interact with data are limited by the number of gestures or interactions that the touch interface can recognize. Additionally, a smartphone may have additional sensors like IMUs that allow a more natural and logical movement through the data. This is contrasted with a computer (e.g., a desktop computer or laptop computer) where the interaction is typically made with a mouse and a keyboard which do not provide such a natural interaction. Also, computers do not typically have IMUs, which forces the user to interact with the data with a mouse and keyboard. Thus, the way the user interacts, selects or even edits depends a lot on the characteristics of device on which the visualization application is running.

In addition, on a smartphone, a user can easily capture images, videos, and/or audios and added them to the project data, while on a computer additions of these types of data are dependent on third party hardware.

At block 206 of FIG. 2, it is determined whether an editing option was selected. If an editing option was selected then block 208 is performed and the project data is updated and processing continues at block 210. In accordance with one or more embodiments of the present invention, updating the project data at block 208 includes synchronizing the update with another copy of the project data. The process of synchronization ensures that two versions of the same project data are automatically merged into one. In accordance with one or more embodiments, a user can set rules for the synchronization according to his/her needs. This step ensures that changes made by one party can be seen/used by another. There are different approaches to these synchronization algorithms, but they all depend on the overall system requirements.

If it is determined at block 206 of FIG. 2 that an editing option was not selected, then processing continues at block 210 with determining whether the user has exited the application. If it is determined that the user has not exited the application, then processing continues at block 204 with displaying the project data. If it is determined at block 210 that the user has exited the application, then the processing is ended at block 212. At block 212, the updated project data may be stored and/or transmitted to another user device.

Figure 3:
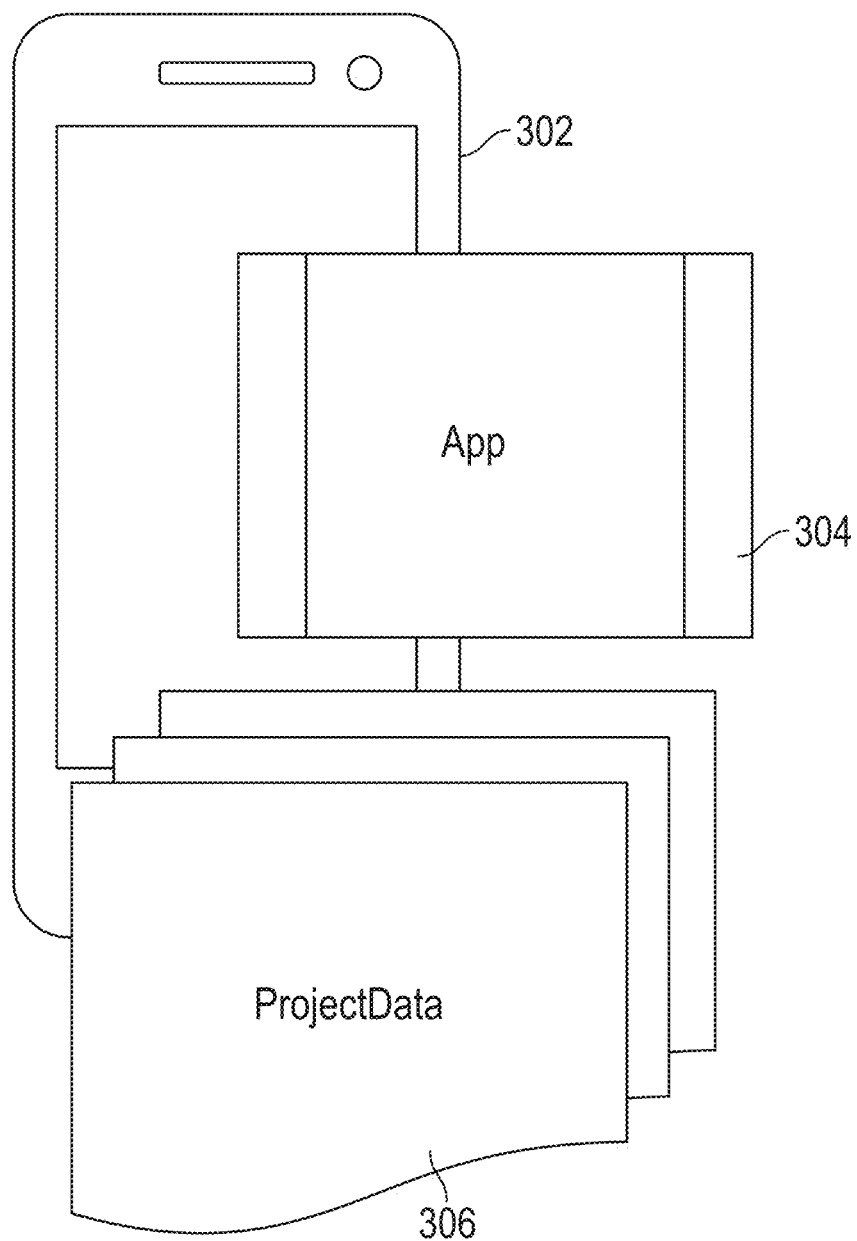
FIG. 3 is a schematic illustration of a measurement system for accessing project data using an application executing on a user device in accordance with one or more embodiments of the present invention.

Turning now to FIG. 3, a schematic illustration of a measurement system 300 for accessing project data 306 using a visualization application 304 executing on a user device 302 is generally shown in accordance with one or more embodiments of the present invention. As shown in FIG. 3, visualization application 304 executes on user device 302 (e.g., a mobile device) without a connection to a measurement device such as measurement device 108 of FIG. 1. In the embodiment shown in FIG. 3 where the user device 302 is operating in an offline mode on locally downloaded project data 306, the user may be limited to editing features such as adding notes, adding photographs, or applying certain filters to the project data 306. The locally edited project data 306 can be shared with a visualization application executing on another user device and/or the copies of the project data can be synchronized.

Figure 4:
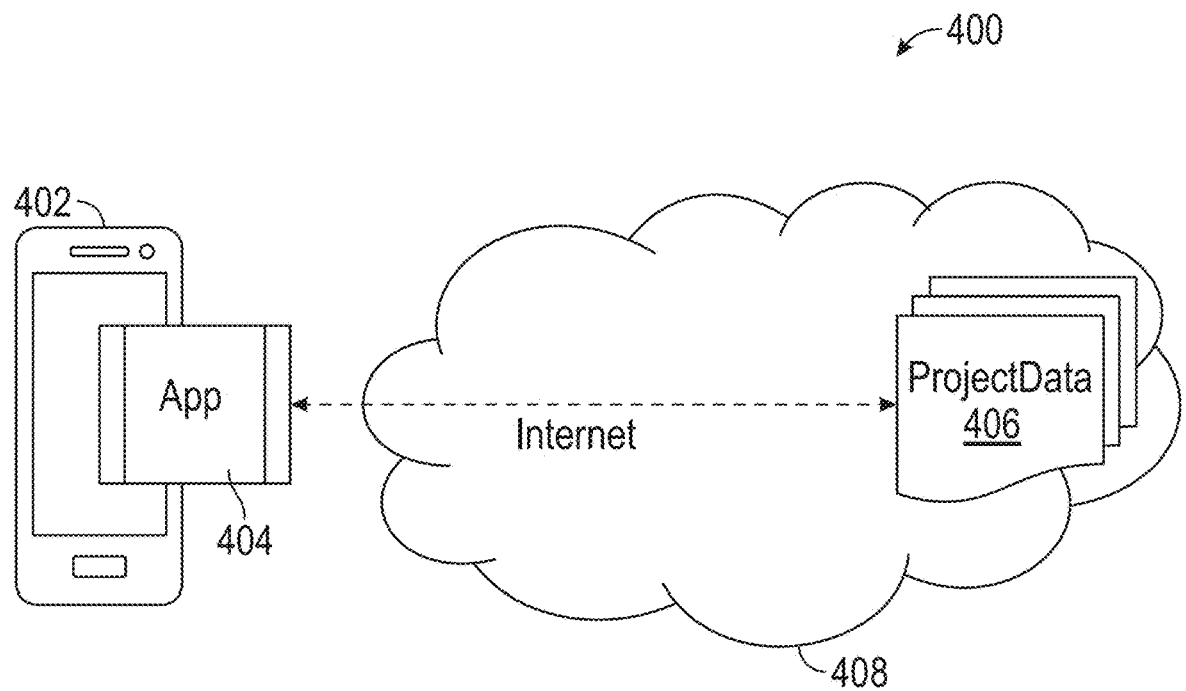
FIG. 4 is a schematic illustration of a measurement system for accessing project data using an application executing on a user device in accordance with one or more embodiments of the present invention.

Turning now to FIG. 4, a schematic illustration of a measurement system 400 for accessing project data 406 using a visualization application 404 executing on a user device 402 is generally shown in accordance with one or more embodiments of the present invention. As shown in FIG. 4, visualization application 404 executes on user device 402 and accesses project data 406 via a network 408 such as the cloud.

The network 408 shown in FIG. 4 can include one or more of any type of known networks including, but not limited to, a wide area network (WAN), a local area network (LAN), a global network (e.g. Internet), a virtual private network (VPN), and an intranet. The network 408 can include a private network in which access thereto is restricted to authorized members. The network 408 can be implemented using wireless networking technologies or any kind of physical network implementation known in the art.

Figure 5:
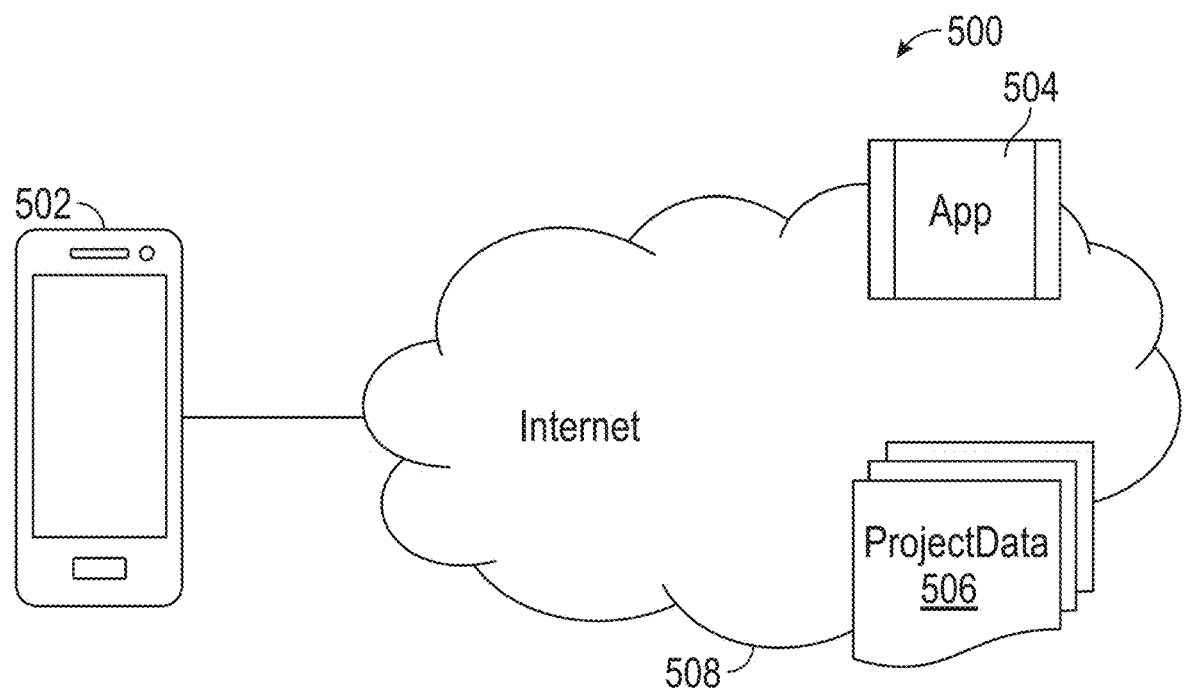
FIG. 5 is a schematic illustration of a measurement system for accessing remote project data using an application executing remotely from a user device in accordance with one or more embodiments of the present invention.

Turning now to FIG. 5 a schematic illustration of a measurement system 500 for accessing remote project data 506 using a visualization application 504 executing remotely from a user device 502 is generally shown in accordance with one or more embodiments of the present invention. As shown in the embodiment of FIG. 5, the user device 502 does not store project data and does not have a visualization application installed, and the user device 502 accesses both via a network 508. As shown in FIG. 5, the visualization application 504 executes in the cloud (e.g., at a mobile website) and the processing of the project data 506 is performed in the cloud. In the embodiment shown in FIG. 5, the user device 502 device functions as a client to provide visualization application functions to a user.

Figure 6:
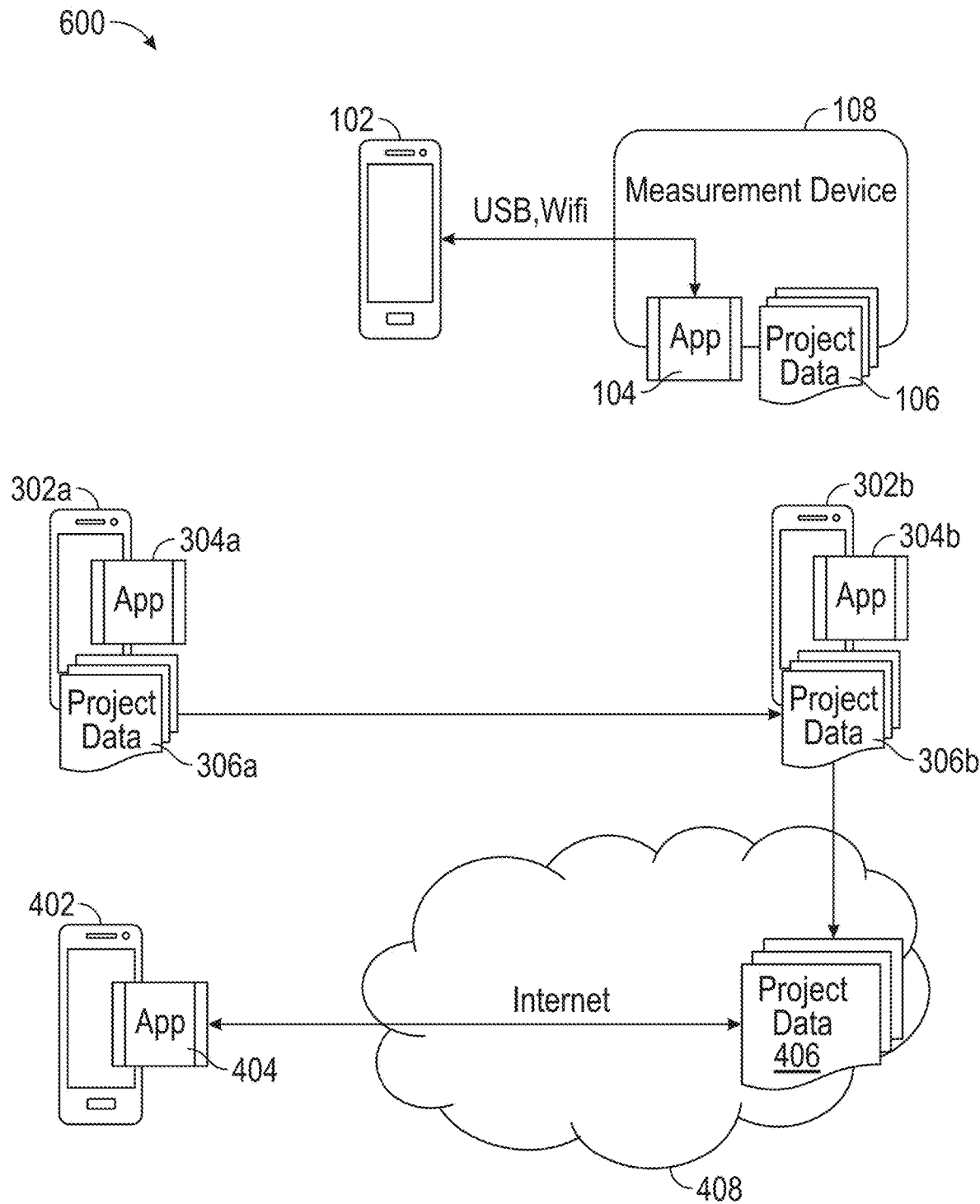
FIG. 6 is a schematic illustration of a distributed measurement system in accordance with one or more embodiments of the present invention.

Turning now to FIG. 6, a schematic illustration of a distributed measurement system 600 is generally shown in accordance with one or more embodiments of the present invention. In the measurement system 600 shown in FIG. 6, the core functions of the measurement device are distributed, that is the visualization application functions can be executed not only on the measurement device itself, but also in the cloud, in a user device, etc. The location of the data can be selected by the user and the projects can be easily shared between the visualization applications executing on one or more different hardware platforms. As shown in FIG. 6, a version of the visualization application 104 tailored for measurement device 108 can be executed on the measurement device via a user interface on the user device 102. Also as shown in FIG. 6, a user executing visualization application 304a on user device 302a using project data 306a can transmit the project data 306a to user device 302b. A user executing visualization application 304b on user device 302b can edit the received project data 306a to create updated project data 306b. The updated project data 306b can be published, or uploaded to the cloud and stored as project data 406. The stored project data 406 can be access by visualization application 404 executing on user device 402.

In accordance with one or more embodiments of the present invention, project data can be transmitted and/or stored as read-only to prevent contents from being updated.

In accordance with one or more embodiments of the present invention, visualization application 104, visualization application 304, and visualization application 404 include the same programming code and the functions provided by each are dynamically modified based on one or both of the characteristics of the user device executing the visualization application and characteristics of the project data being accessed.

In accordance with one or more embodiments of the present invention, data protection is guaranteed be implementing digital signatures in order to protect the data against undesired changes (e.g., avoiding corrupt projects). For example, only authorized visualization applications can be given the ability to sign data in a project which will prevent non-authorized applications (i.e., those without the official key) from making updates to the data. Alternatively, or in addition, the privacy of the data can be ensured using encryption and/or different access modes can be granted to different users or applications accessing the data.

It is understood in advance that although this disclosure describes providing a distributed measurement system in reference to cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various user devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. In essence, cloud computing is an infrastructure made up of a network of interconnected nodes.

Figure 7:
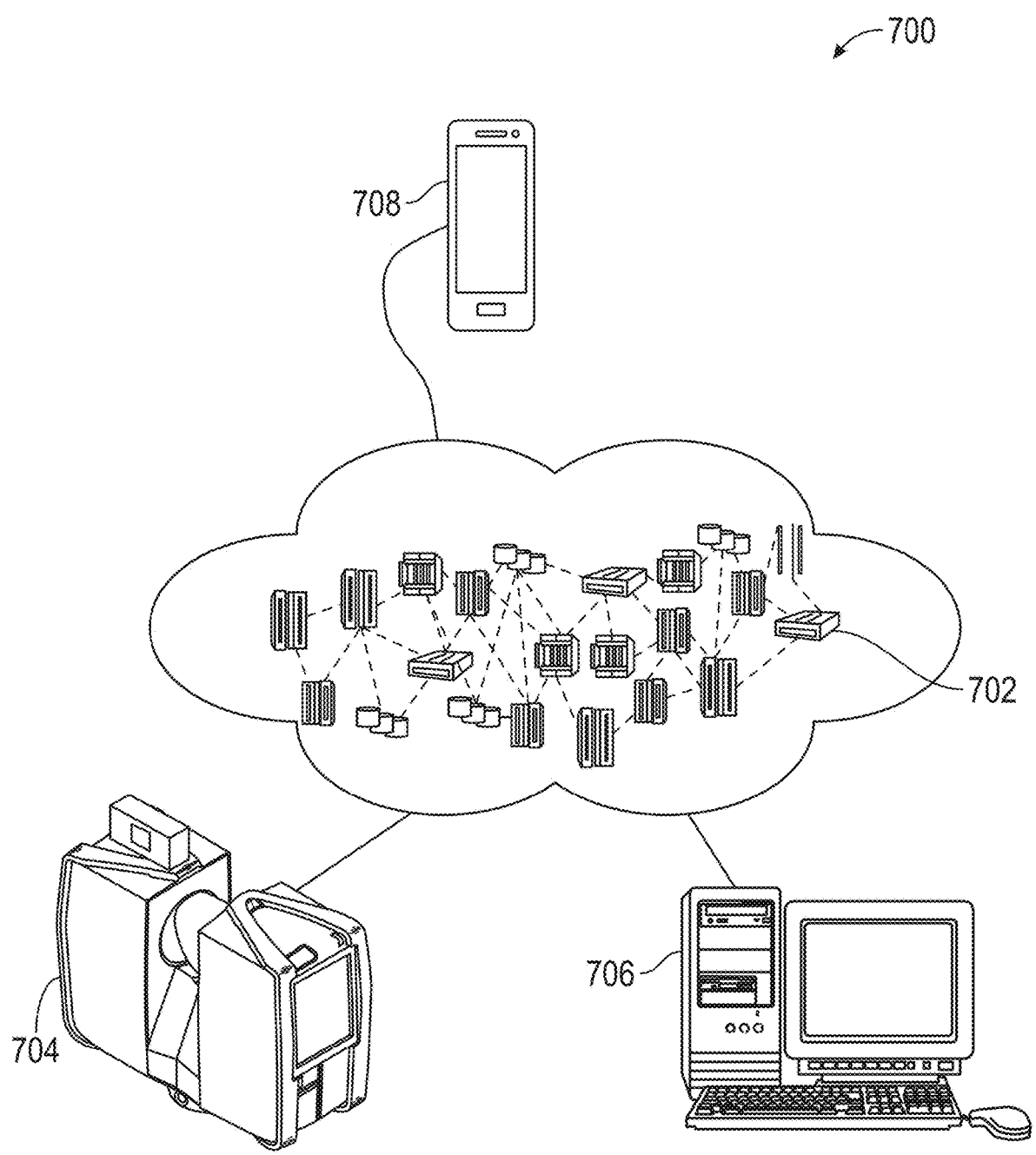
FIG. 7 is a schematic illustration of a cloud computing environment in accordance with one or more embodiments of the present invention.

Referring now to FIG. 7, an illustrative cloud computing environment 700 is depicted. As shown, cloud computing environment 700 comprises one or more cloud computing nodes 702 with which local computing devices used by cloud consumers, such as, for example, coordinate measurement device 704 and computers 706 708 may communicate. In an embodiment, the processing described herein is performed through the cooperation of computer 708 or 706, and the coordinate measurement device 704. Nodes 702 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 704-708 shown in FIG. 7 are intended to be illustrative only and that computing nodes 702 and cloud computing environment 700 can communicate with any type of computerized device over any type of network and/or network addressable connection (e.g., using a web browser).

Figure 8:
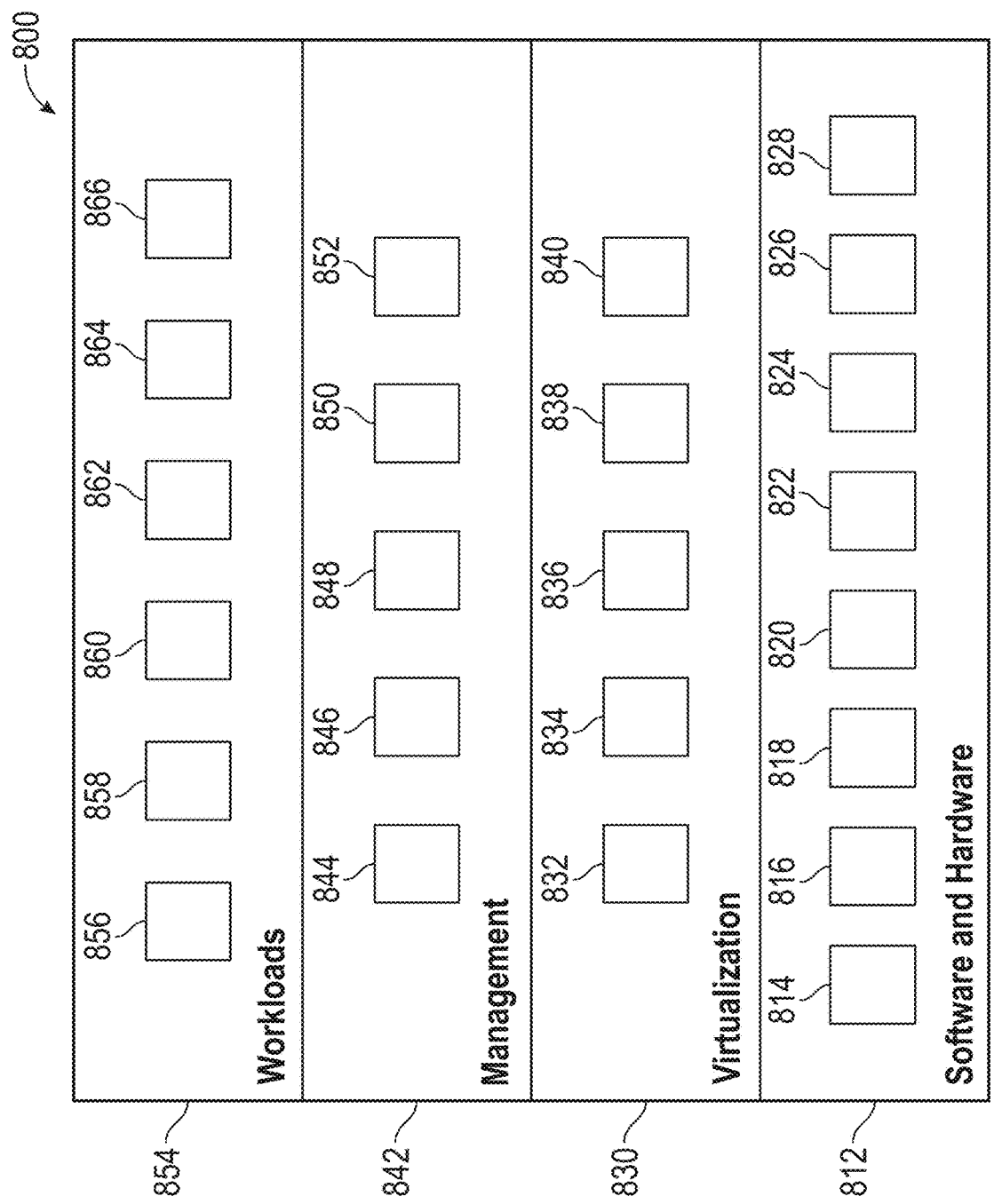
FIG. 8 is a schematic illustration of an abstraction model layers in accordance with one or more embodiments of the present invention.

Referring now to FIG. 8, a set of functional abstraction layers provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided: hardware and software layer 812 includes hardware and software components. Examples of hardware components include, but are not limited to: mainframes 814; desktop computer workstations; laptops; tablets; mobile telephones; RISC (Reduced Instruction Set Computer) architecture based servers 816; servers 818; blade servers 820; storage devices 822; and networks and networking components 824. In some embodiments hardware components are imbedded or integrated into measurement or digital asset collections system. In some embodiments, software components include network application server software 826, and database software 828; virtualization layer 830 provides an abstraction layer from which the following examples of virtual entities may be provided: virtual servers 832; virtual storage 834; virtual networks 836, including virtual private networks; virtual applications and operating systems 838; and virtual clients 840.

In one example, management layer 842 may provide the functions described below. Resource provisioning 844 provides dynamic procurement of computing resources and other resources that are utilized to perform tasks within the cloud computing environment. Metering and pricing 846 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 848 provides access to the cloud computing environment for consumers and system administrators. Service level management 850 provides cloud computing resource allocation and management such that required service levels are met. Service Level Agreement (SLA) planning and fulfillment 852 provides pre-arrangement for, and procurement of, cloud computing resources for which a future requirement is anticipated in accordance with an SLA.

Workloads layer 854 provides examples of functionality for which the cloud computing environment may be utilized. Examples of workloads and functions which may be provided from this layer include: mapping and navigation 856; software development and lifecycle management 858; transaction processing 860; scan processing software 862; distributed measurement system processing 864; and user defined content to point cloud processing 866.

Figure 9:
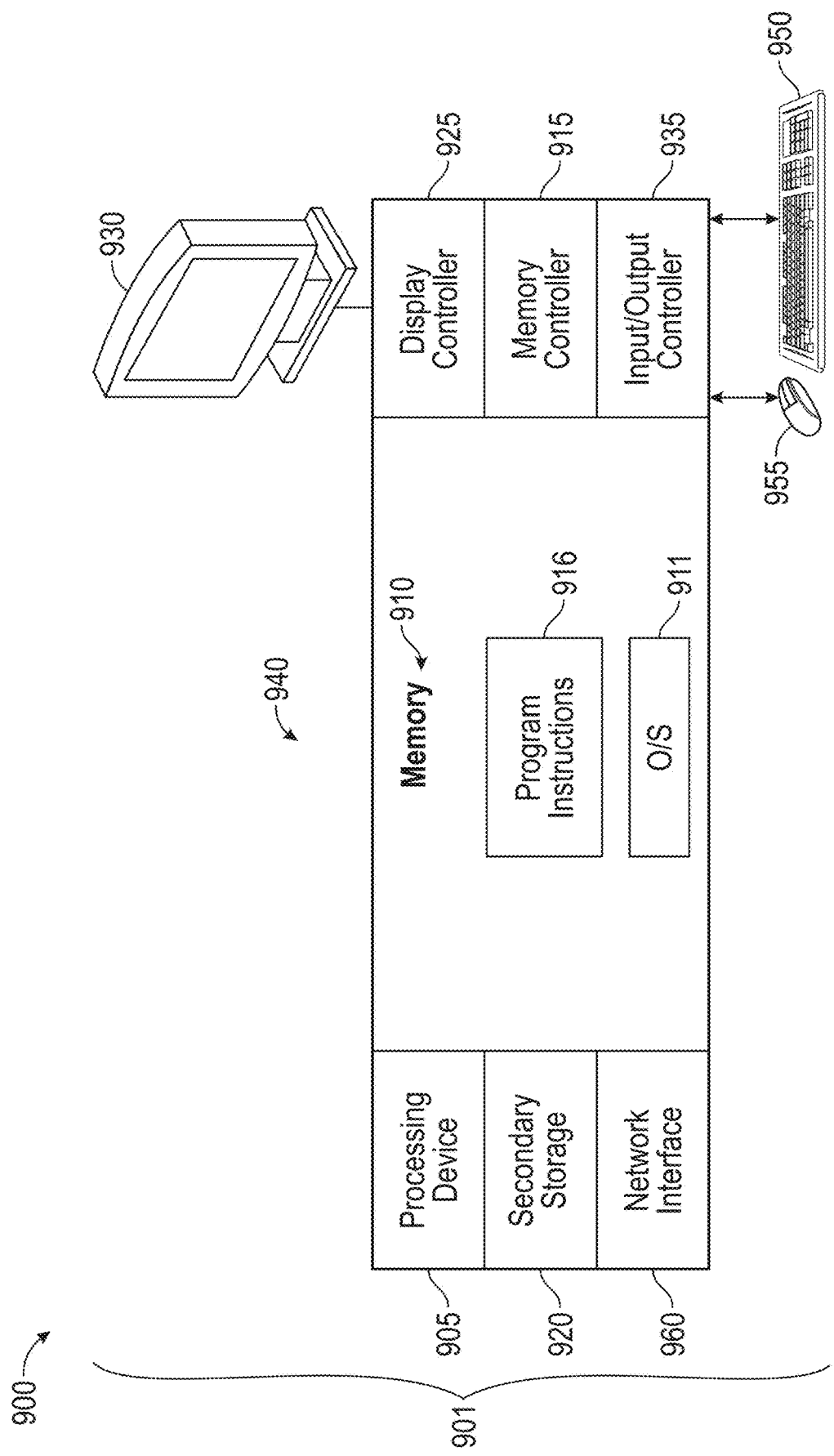
FIG. 9 is a schematic illustration of a computer system in accordance with one or more embodiments of the present invention

Turning now to FIG. 9, a schematic illustration of a system 900 is depicted upon which aspects of one or more embodiments of providing a distributed measurement system for scanning projects may be implemented. In an embodiment, all or a portion of the system 900 may be incorporated into one or more of the measurement devices, user devices, and processors described herein. In one or more exemplary embodiments, in terms of hardware architecture, as shown in FIG. 9, the computer 901 includes a processing device 905 and a memory 910 coupled to a memory controller 915 and an input/output controller 935. The input/output controller 935 can be, for example, but not limited to, one or more buses or other wired or wireless connections, as is known in the art. The input/output controller 935 may have additional elements, which are omitted for simplicity, such as controllers, buffers (caches), drivers, repeaters, and receivers, to enable communications. Further, the computer 901 may include address, control, and/or data connections to enable appropriate communications among the aforementioned components.

In one or more exemplary embodiments, a keyboard 950 and mouse 955 or similar devices can be coupled to the input/output controller 935. Alternatively, input may be received via a touch-sensitive or motion sensitive interface (not depicted). The computer 901 can further include a display controller 925 coupled to a display 930.

The processing device 905 is a hardware device for executing software, particularly software stored in secondary storage 920 or memory 910. The processing device 905 can be any custom made or commercially available computer processor, a central processing unit (CPU), an auxiliary processor among several processors associated with the computer 901, a semiconductor-based microprocessor (in the form of a microchip or chip set), a macro-processor, or generally any device for executing instructions.

The memory 910 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), flash memory, programmable read only memory (PROM), tape, compact disc read only memory (CD-ROM), flash drive, disk, hard disk drive, diskette, cartridge, cassette or the like, etc.). Moreover, the memory 910 may incorporate electronic, magnetic, optical, and/or other types of storage media. Accordingly, the memory 910 is an example of a tangible computer readable storage medium 940 upon which instructions executable by the processing device 905 may be embodied as a computer program product. The memory 910 can have a distributed architecture, where various components are situated remote from one another, but can be accessed by the processing device 905.

The instructions in memory 910 may include one or more separate programs, each of which comprises an ordered listing of executable instructions for implementing logical functions. In the example of FIG. 9, the instructions in the memory 910 include a suitable operating system (OS) 911 and program instructions 916. The operating system 911 essentially controls the execution of other computer programs and provides scheduling, input-output control, file and data management, memory management, and communication control and related services. When the computer 901 is in operation, the processing device 905 is configured to execute instructions stored within the memory 910, to communicate data to and from the memory 910, and to generally control operations of the computer 901 pursuant to the instructions. Examples of program instructions 916 can include instructions to implement the processing described herein.

The computer 901 of FIG. 9 also includes a network interface 960 that can establish communication channels with one or more other computer systems via one or more network links. The network interface 960 can support wired and/or wireless communication protocols known in the art. For example, when embodied in a user system, the network interface 960 can establish communication channels with an application server.

Any measurement device known in the art can be utilized by one or more embodiments of the present invention. A laser scanner is an example of one type of measurement device that can be utilized.

Referring now to FIGS. 10-13, a laser scanner 20 is shown for optically scanning and measuring the environment surrounding the laser scanner 20. The laser scanner 20 has a measuring head 22 and a base 24. The measuring head 22 is mounted on the base 24 such that the laser scanner 20 may be rotated about a vertical axis 23. In one embodiment, the measuring head 22 includes a gimbal point 27 that is a center of rotation about the vertical axis 23 and a horizontal axis 25. The measuring head 22 has a rotary mirror 26, which may be rotated about the horizontal axis 25. The rotation about the vertical axis may be about the center of the base 24. The terms vertical axis and horizontal axis refer to the scanner in its normal upright position. It is possible to operate a 3D coordinate measurement device on its side or upside down, and so to avoid confusion, the terms azimuth axis and zenith axis may be substituted for the terms vertical axis and horizontal axis, respectively. The term pan axis or standing axis may also be used as an alternative to vertical axis.

The measuring head 22 is further provided with an electromagnetic radiation emitter, such as light emitter 28, for example, that emits an emitted light beam 29. In one embodiment, the emitted light beam 29 is a coherent light beam such as a laser beam. The laser beam may have a wavelength range of approximately 300 to 1600 nanometers, for example 790 nanometers, 905 nanometers, 1550 nm, or less than 400 nanometers. It should be appreciated that other electromagnetic radiation beams having greater or smaller wavelengths may also be used. The emitted light beam 29 is amplitude or intensity modulated, for example, with a sinusoidal waveform or with a rectangular waveform. The emitted light beam 29 is emitted by the light emitter 28 onto a beam steering unit, such as mirror 26, where it is deflected to the environment. A reflected light beam 32 is reflected from the environment by an object 34. The reflected or scattered light is intercepted by the rotary mirror 26 and directed into a light receiver 36. The directions of the emitted light beam 29 and the reflected light beam 32 result from the angular positions of the rotary mirror 26 and the measuring head 22 about the axes 25 and 23, respectively. These angular positions in turn depend on the corresponding rotary drives or motors.

Coupled to the light emitter 28 and the light receiver 36 is a controller 38. The controller 38 determines, for a multitude of measuring points X, a corresponding number of distances d between the laser scanner 20 and the points X on object 34. The distance to a particular point X is determined based at least in part on the speed of light in air through which electromagnetic radiation propagates from the device to the object point X. In one embodiment the phase shift of modulation in light emitted by the laser scanner 20 and the point X is determined and evaluated to obtain a measured distance d.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight (TOF) of the light in the air (the round-trip time for the light to travel from the device to the object and back to the device). Examples of TOF scanners include scanners that measure round trip time using the time interval between emitted and returning pulses (pulsed TOF scanners), scanners that modulate light sinusoidally and measure phase shift of the returning light (phase-based scanners), as well as many other types. A method of measuring distance based on the time-of-flight of light depends on the speed of light in air and is therefore easily distinguished from methods of measuring distance based on triangulation. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on one known length and two known angles of a triangle. The method of triangulation, therefore, does not directly depend on the speed of light in air.

In one mode of operation, the scanning of the volume around the laser scanner 20 takes place by rotating the rotary mirror 26 relatively quickly about axis 25 while rotating the measuring head 22 relatively slowly about axis 23, thereby, moving the assembly in a spiral pattern. In an exemplary embodiment, the rotary mirror rotates at a maximum speed of 5820 revolutions per minute. For such a scan, the gimbal point 27 defines the origin of the local stationary reference system. The base 24 rests in this local stationary reference system. In addition to measuring a distance d from the gimbal point 27 to an object point X, the scanner 20 may also collect gray-scale information related to the received optical power (equivalent to the term "brightness.") The gray-scale value may be determined at least in part, for example, by integration of the bandpass-filtered and amplified signal in the light receiver 36 over a measuring period attributed to the object point X.

Figure 10:
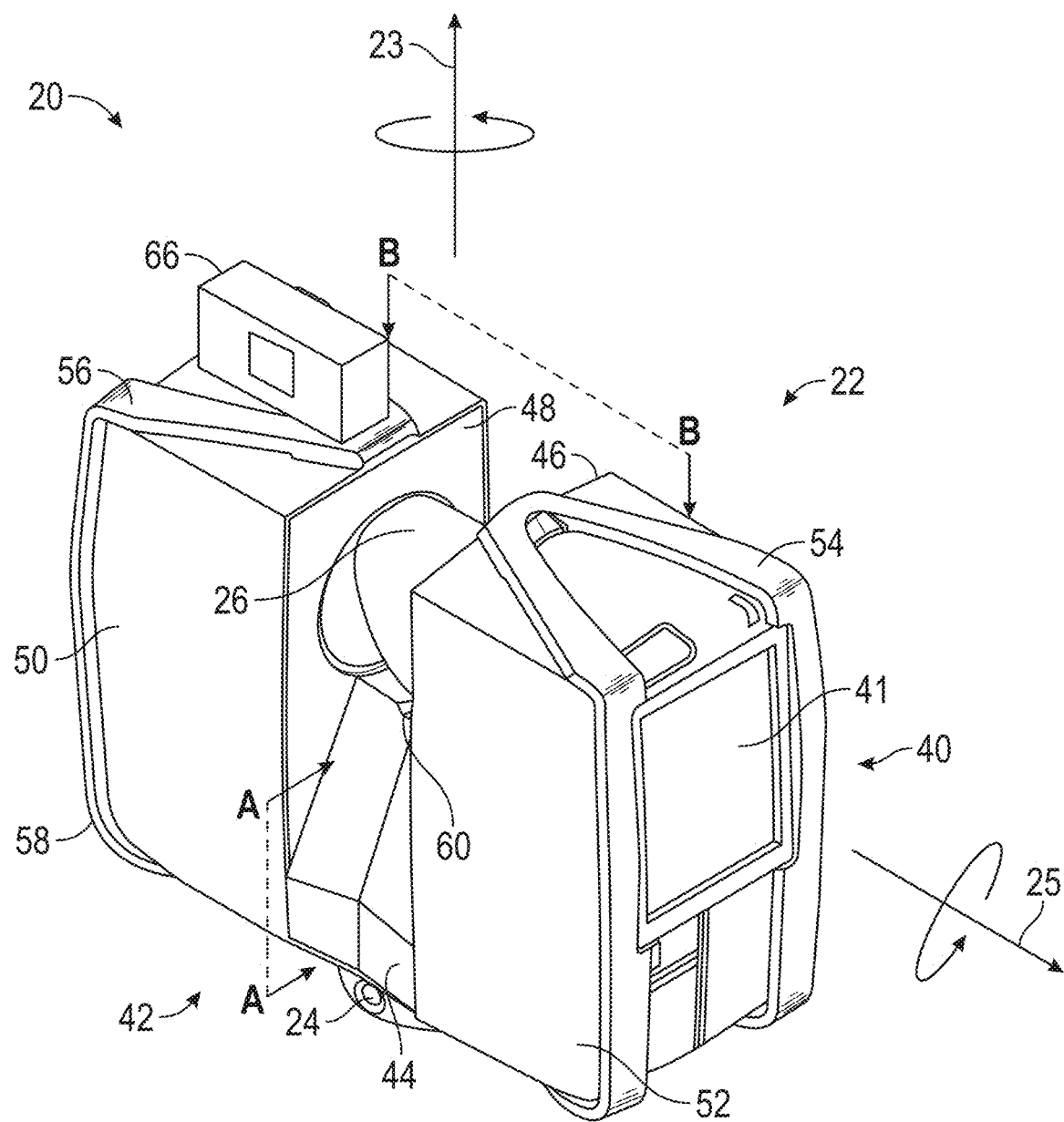
FIG. 10 is a perspective view of a laser scanner in accordance with one or more embodiments of the present invention.

The measuring head 22 may include a display device 40 integrated into the laser scanner 20. The display device 40 may include a graphical touch screen 41, as shown in FIG. 10, which allows the operator to set the parameters or initiate the operation of the laser scanner 20. For example, the screen 41 may have a user interface that allows the operator to provide measurement instructions to the device, and the screen may also display measurement results.

The laser scanner 20 includes a carrying structure 42 that provides a frame for the measuring head 22 and a platform for attaching the components of the laser scanner 20. In one embodiment, the carrying structure 42 is made from a metal such as aluminum. The carrying structure 42 includes a traverse member 44 having a pair of walls 46, 48 on opposing ends. The walls 46, 48 are parallel to each other and extend in a direction opposite the base 24. Shells 50, 52 are coupled to the walls 46, 48 and cover the components of the laser scanner 20. In the exemplary embodiment, the shells 50, 52 are made from a plastic material, such as polycarbonate or polyethylene for example. The shells 50, 52 cooperate with the walls 46, 48 to form a housing for the laser scanner 20.

On an end of the shells 50, 52 opposite the walls 46, 48 a pair of yokes 54, 56 are arranged to partially cover the respective shells 50, 52. In the exemplary embodiment, the yokes 54, 56 are made from a suitably durable material, such as aluminum for example, that assists in protecting the shells 50, 52 during transport and operation. The yokes 54, 56 each includes a first arm portion 58 that is coupled, such as with a fastener for example, to the traverse 44 adjacent the base 24. The arm portion 58 for each yoke 54, 56 extends from the traverse 44 obliquely to an outer corner of the respective shell 50, 52. From the outer corner of the shell, the yokes 54, 56 extend along the side edge of the shell to an opposite outer corner of the shell. Each yoke 54, 56 further includes a second arm portion that extends obliquely to the walls 46, 48. It should be appreciated that the yokes 54, 56 may be coupled to the traverse 42, the walls 46, 48 and the shells 50, 52 at multiple locations.

The pair of yokes 54, 56 cooperate to circumscribe a convex space within which the two shells 50, 52 are arranged. In the exemplary embodiment, the yokes 54, 56 cooperate to cover all of the outer edges of the shells 50, 52, while the top and bottom arm portions project over at least a portion of the top and bottom edges of the shells 50, 52. This provides advantages in protecting the shells 50, 52 and the measuring head 22 from damage during transportation and operation. In other embodiments, the yokes 54, 56 may include additional features, such as handles to facilitate the carrying of the laser scanner 20 or attachment points for accessories for example.

On top of the traverse 44, a prism 60 is provided. The prism extends parallel to the walls 46, 48. In the exemplary embodiment, the prism 60 is integrally formed as part of the carrying structure 42. In other embodiments, the prism 60 is a separate component that is coupled to the traverse 44. When the mirror 26 rotates, during each rotation the mirror 26 directs the emitted light beam 29 onto the traverse 44 and the prism 60. Due to non-linearities in the electronic components, for example in the light receiver 36, the measured distances d may depend on signal strength, which may be measured in optical power entering the scanner or optical power entering optical detectors within the light receiver 36, for example. In an embodiment, a distance correction is stored in the scanner as a function (possibly a nonlinear function) of distance to a measured point and optical power (generally unscaled quantity of light power sometimes referred to as "brightness") returned from the measured point and sent to an optical detector in the light receiver 36. Since the prism 60 is at a known distance from the gimbal point 27, the measured optical power level of light reflected by the prism 60 may be used to correct distance measurements for other measured points, thereby allowing for compensation to correct for the effects of environmental variables such as temperature. In the exemplary embodiment, the resulting correction of distance is performed by the controller 38.

In an embodiment, the base 24 is coupled to a swivel assembly (not shown) such as that described in commonly owned U.S. Pat. No. 8,705,012 ('012), which is incorporated by reference herein. The swivel assembly is housed within the carrying structure 42 and includes a motor 138 that is configured to rotate the measuring head 22 about the axis 23. In an embodiment, the angular/rotational position of the measuring head 22 about the axis 23 is measured by angular encoder 134.

An auxiliary image acquisition device 66 may be a device that captures and measures a parameter associated with the scanned area or the scanned object and provides a signal representing the measured quantities over an image acquisition area. The auxiliary image acquisition device 66 may be, but is not limited to, a pyrometer, a thermal imager, an ionizing radiation detector, or a millimeter-wave detector. In an embodiment, the auxiliary image acquisition device 66 is a color camera.

In an embodiment, a central color camera (first image acquisition device) 112 is located internally to the scanner and may have the same optical axis as the 3D scanner device. In this embodiment, the first image acquisition device 112 is integrated into the measuring head 22 and arranged to acquire images along the same optical pathway as emitted light beam 29 and reflected light beam 32. In this embodiment, the light from the light emitter 28 reflects off a fixed mirror 116 and travels to dichroic beam-splitter 118 that reflects the light 117 from the light emitter 28 onto the rotary mirror 26. In an embodiment, the mirror 26 is rotated by a motor 136 and the angular/rotational position of the mirror is measured by angular encoder 134. The dichroic beam-splitter 118 allows light to pass through at wavelengths different than the wavelength of light 117. For example, the light emitter 28 may be a near infrared laser light (for example, light at wavelengths of 780 nm or 1150 nm), with the dichroic beam-splitter 118 configured to reflect the infrared laser light while allowing visible light (e.g., wavelengths of 400 to 700 nm) to transmit through. In other embodiments, the determination of whether the light passes through the beam-splitter 118 or is reflected depends on the polarization of the light. The digital camera 111 obtains 2D images of the scanned area to capture color data to add to the scanned image. In the case of a built-in color camera having an optical axis coincident with that of the 3D scanning device, the direction of the camera view may be easily obtained by simply adjusting the steering mechanisms of the scanner—for example, by adjusting the azimuth angle about the axis 23 and by steering the mirror 26 about the axis 25.

Figure 11:
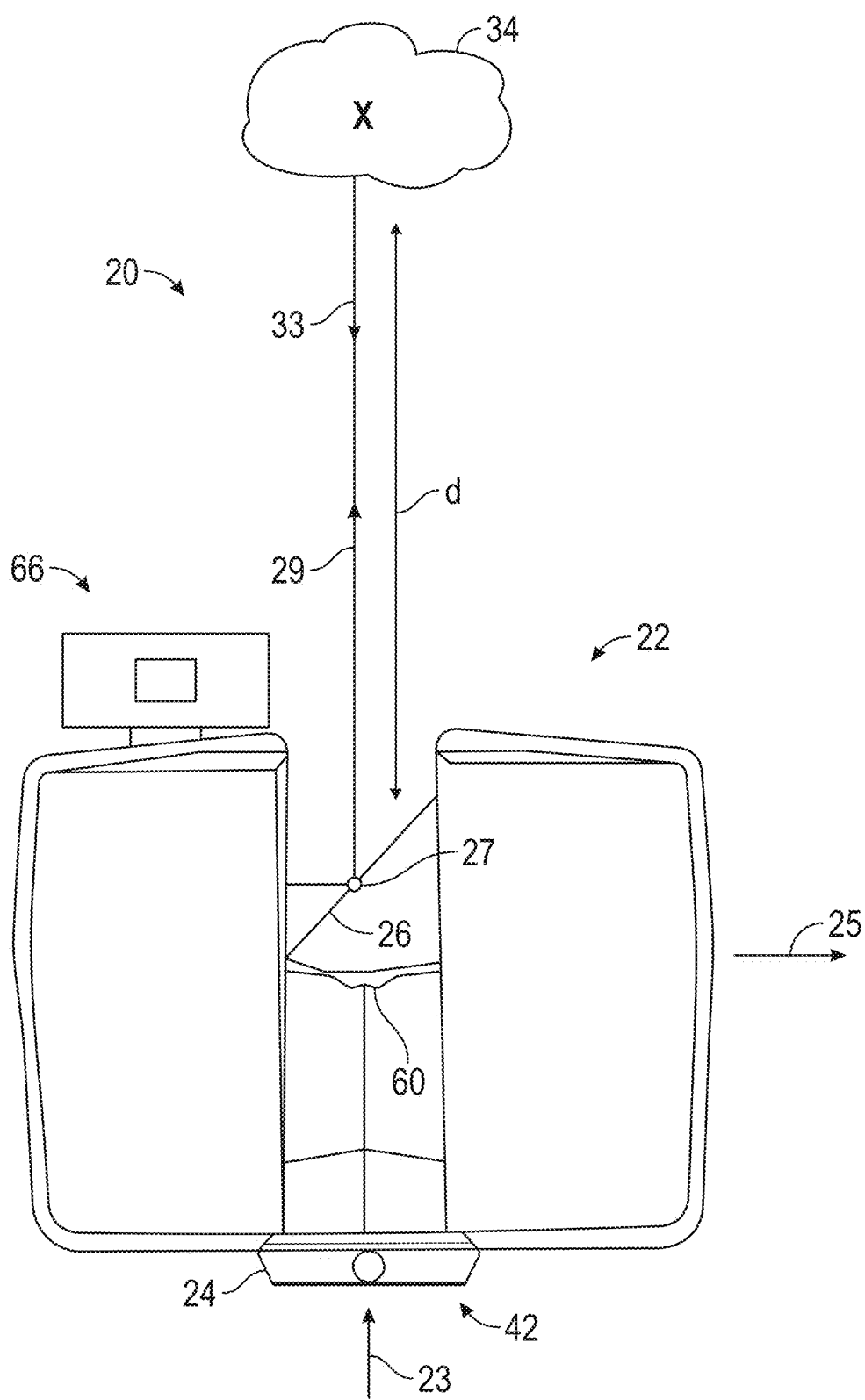
FIG. 11 is a side view of the laser scanner illustrating a method of measurement in accordance with one or more embodiments of the present invention.
Figure 12:
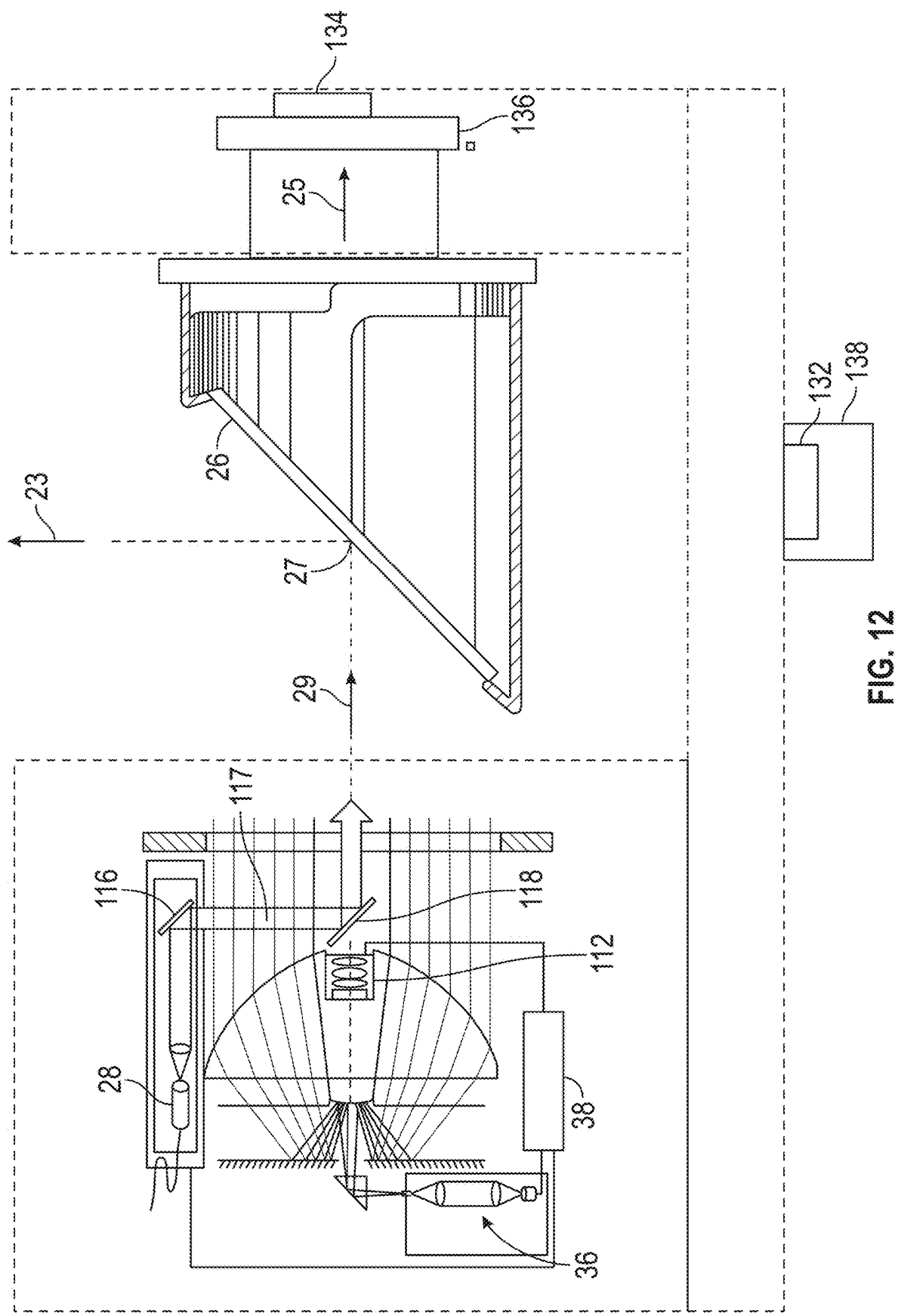
FIG. 12 is a schematic illustration of the optical, mechanical, and electrical components of the laser scanner in accordance with one or more embodiments of the present invention.
Figure 13:
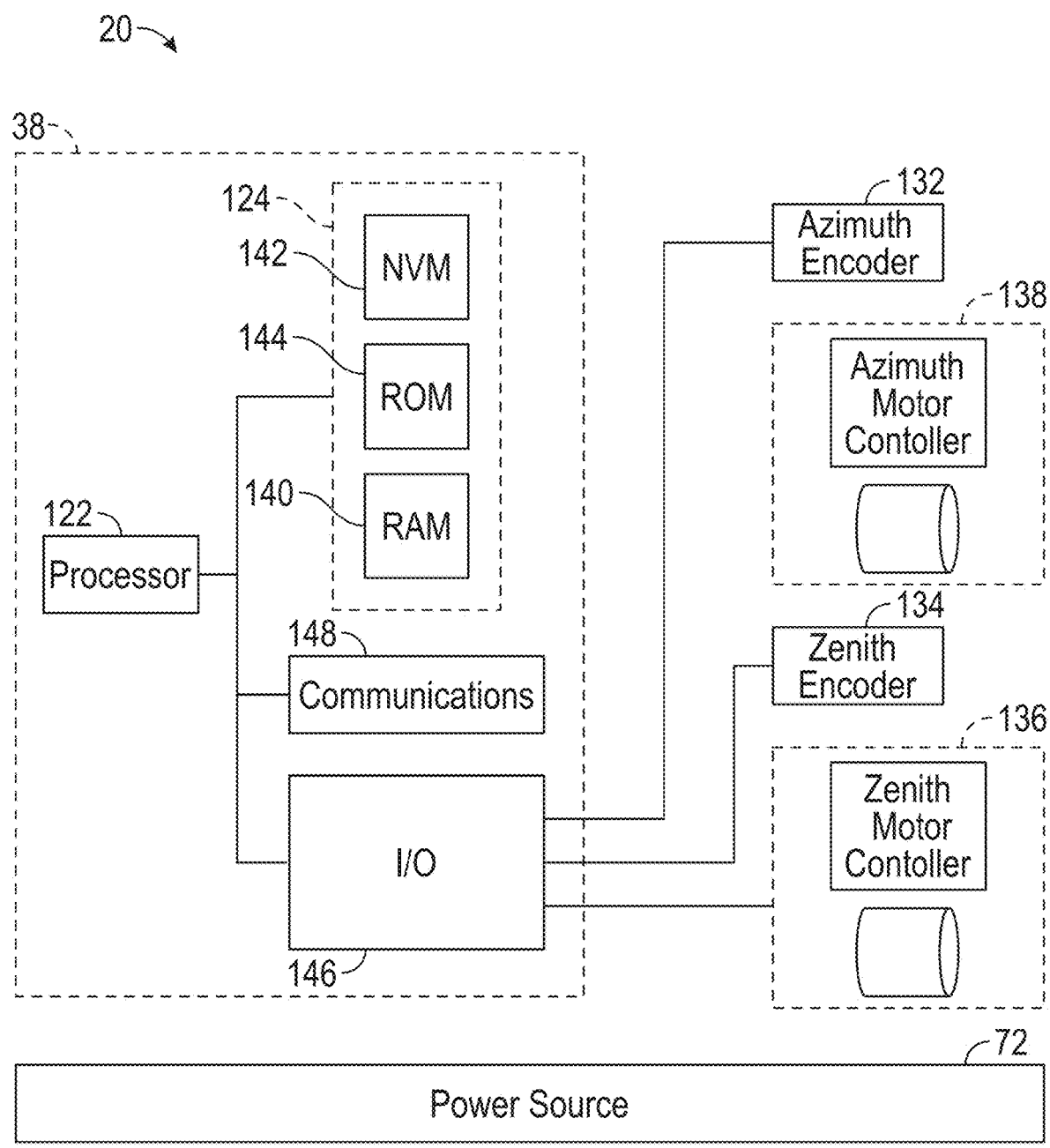
FIG. 13 is a schematic illustration of the laser scanner of FIG. 10 in accordance with one or more embodiments of the present invention.

Referring now to FIG. 13 with continuing reference to FIGS. 10-12, elements are shown of the laser scanner 20. Controller 38 is a suitable electronic device capable of accepting data and instructions, executing the instructions to process the data, and presenting the results. The controller 38 includes one or more processing elements 122. The processors may be microprocessors, field programmable gate arrays (FPGAs), digital signal processors (DSPs), and generally any device capable of performing computing functions. The one or more processors 122 have access to memory 124 for storing information.

Controller 38 is capable of converting the analog voltage or current level provided by light receiver 36 into a digital signal to determine a distance from the laser scanner 20 to an object in the environment. Controller 38 uses the digital signals that act as input to various processes for controlling the laser scanner 20. The digital signals represent one or more laser scanner 20 data including but not limited to distance to an object, images of the environment, images acquired by panoramic camera 66, angular/rotational measurements by a first or azimuth encoder 132, and angular/rotational measurements by a second axis or zenith encoder 134.

In general, controller 38 accepts data from encoders 132, 134, light receiver 36, light source 28, and panoramic camera 66 and is given certain instructions for the purpose of generating a 3D point cloud of a scanned environment. Controller 38 provides operating signals to the light source 28, light receiver 36, panoramic camera 66, zenith motor 136 and azimuth motor 138. The controller 38 compares the operational parameters to predetermined variances and if the predetermined variance is exceeded, generates a signal that alerts an operator to a condition. The data received by the controller 38 may be displayed on a user interface coupled to controller 38. The user interface may be one or more LEDs (light-emitting diodes) 82, an LCD (liquid-crystal diode) display, a CRT (cathode ray tube) display, a touch-screen display or the like. A keypad may also be coupled to the user interface for providing data input to controller 38. In one embodiment, the user interface is arranged or executed on a mobile computing device that is coupled for communication, such as via a wired or wireless communications medium (e.g. Ethernet, serial, USB, Bluetooth™ or WiFi) for example, to the laser scanner 20.

The controller 38 may also be coupled to external computer networks such as a local area network (LAN) and the Internet. A LAN interconnects one or more remote computers, which are configured to communicate with controller 38 using a well-known computer communications protocol such as TCP/IP (Transmission Control Protocol/Internet(ˆ) Protocol), RS-232, ModBus, and the like. Additional systems may also be connected to LAN with the controllers 38 in each of these systems being configured to send and receive data to and from remote computers and other systems. The LAN may be connected to the Internet. This connection allows controller 38 to communicate with one or more remote computers connected to the Internet.

The processors 122 are coupled to memory 124. The memory 124 may include random access memory (RAM) device 140, a non-volatile memory (NVM) device 142, and a read-only memory (ROM) device 144. In addition, the processors 122 may be connected to one or more input/output (I/O) controllers 146 and a communications circuit 148. In an embodiment, the communications circuit 92 provides an interface that allows wireless or wired communication with one or more external devices or networks, such as the LAN discussed above.

Controller 38 includes operation control methods embodied in computer instructions written to be executed by processors 122, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Figure 14:
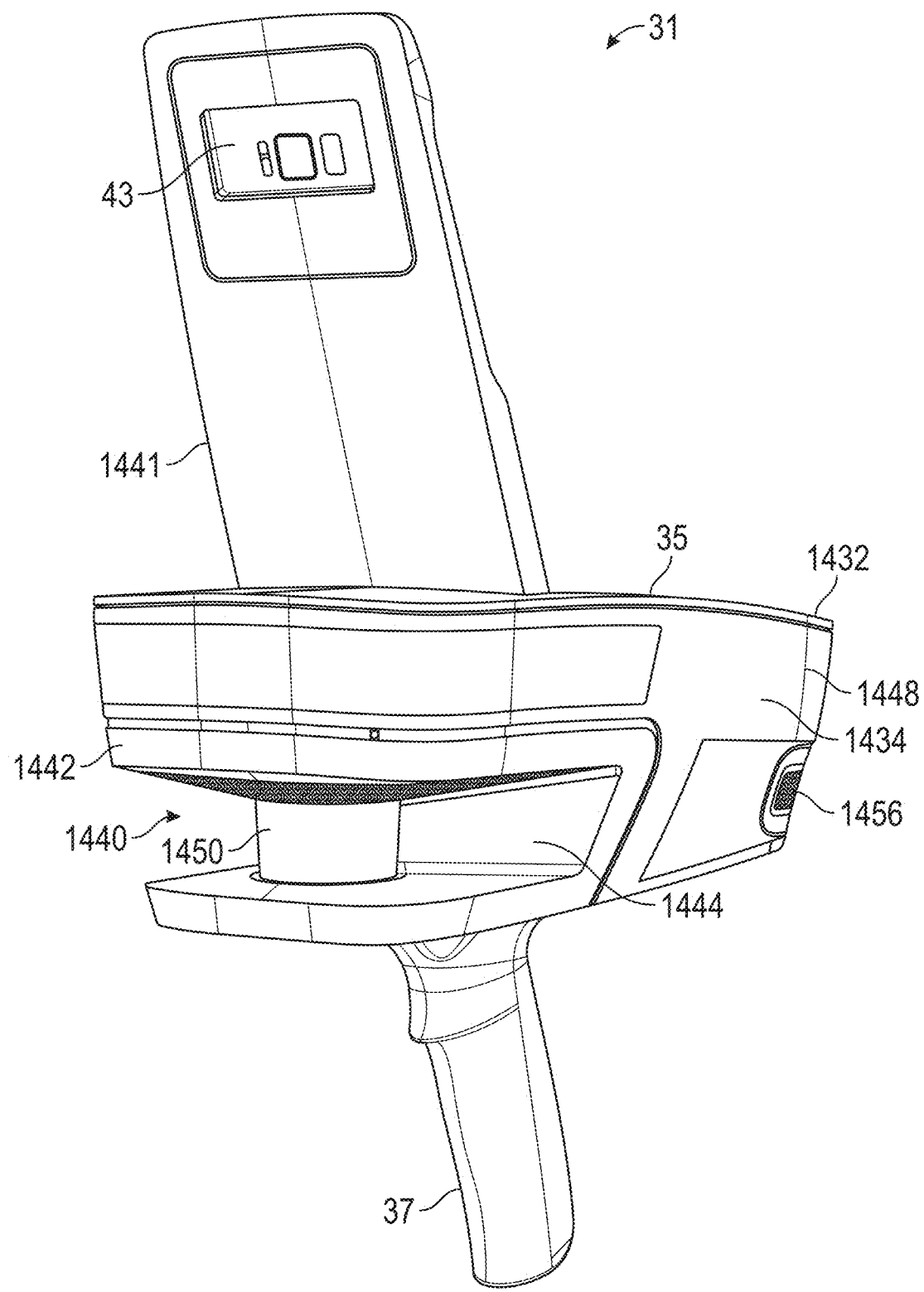
FIGS. 14-16 are perspective views of a scanning and mapping system in accordance with one or more embodiments of the present invention.
Figure 15:
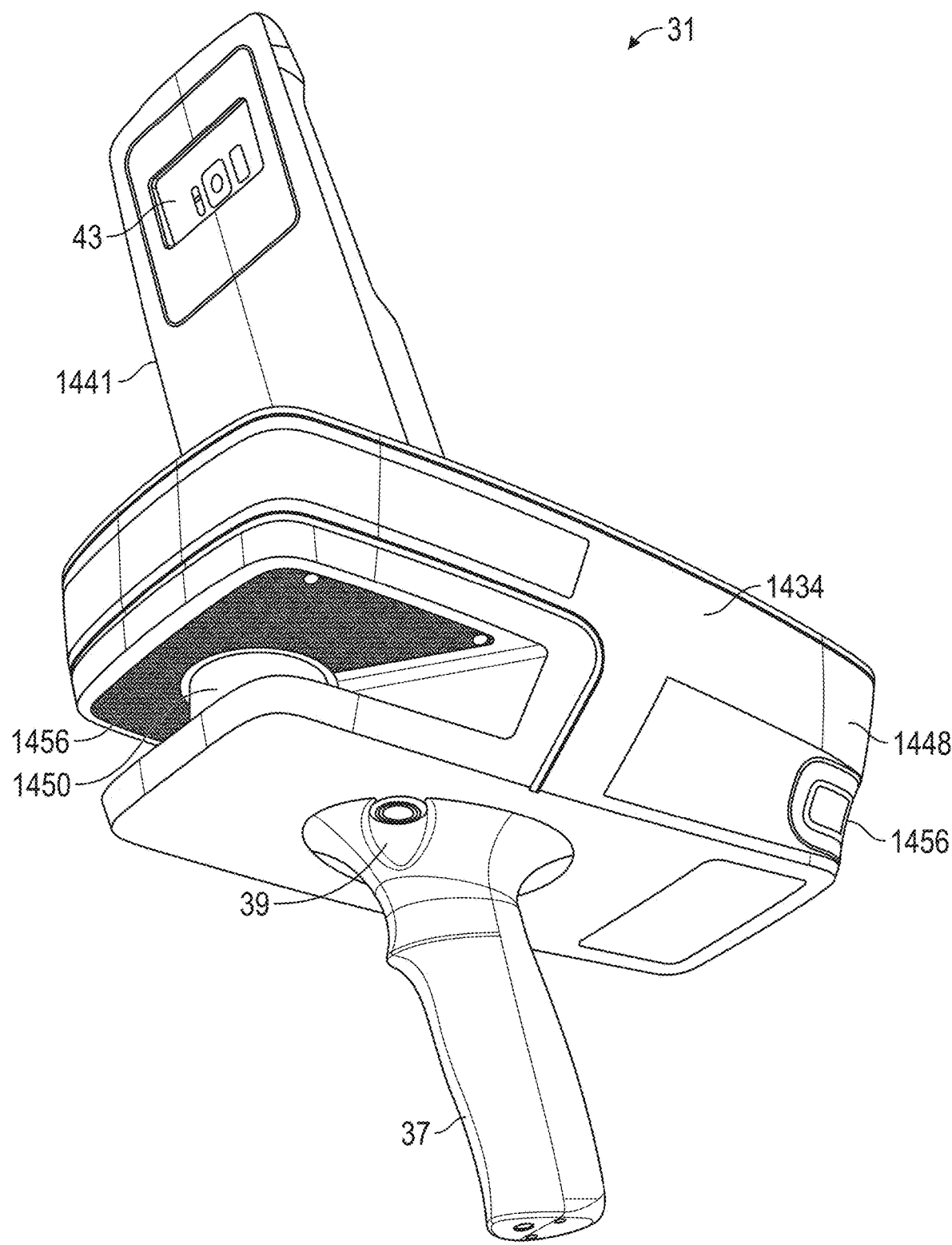
Figure 16:
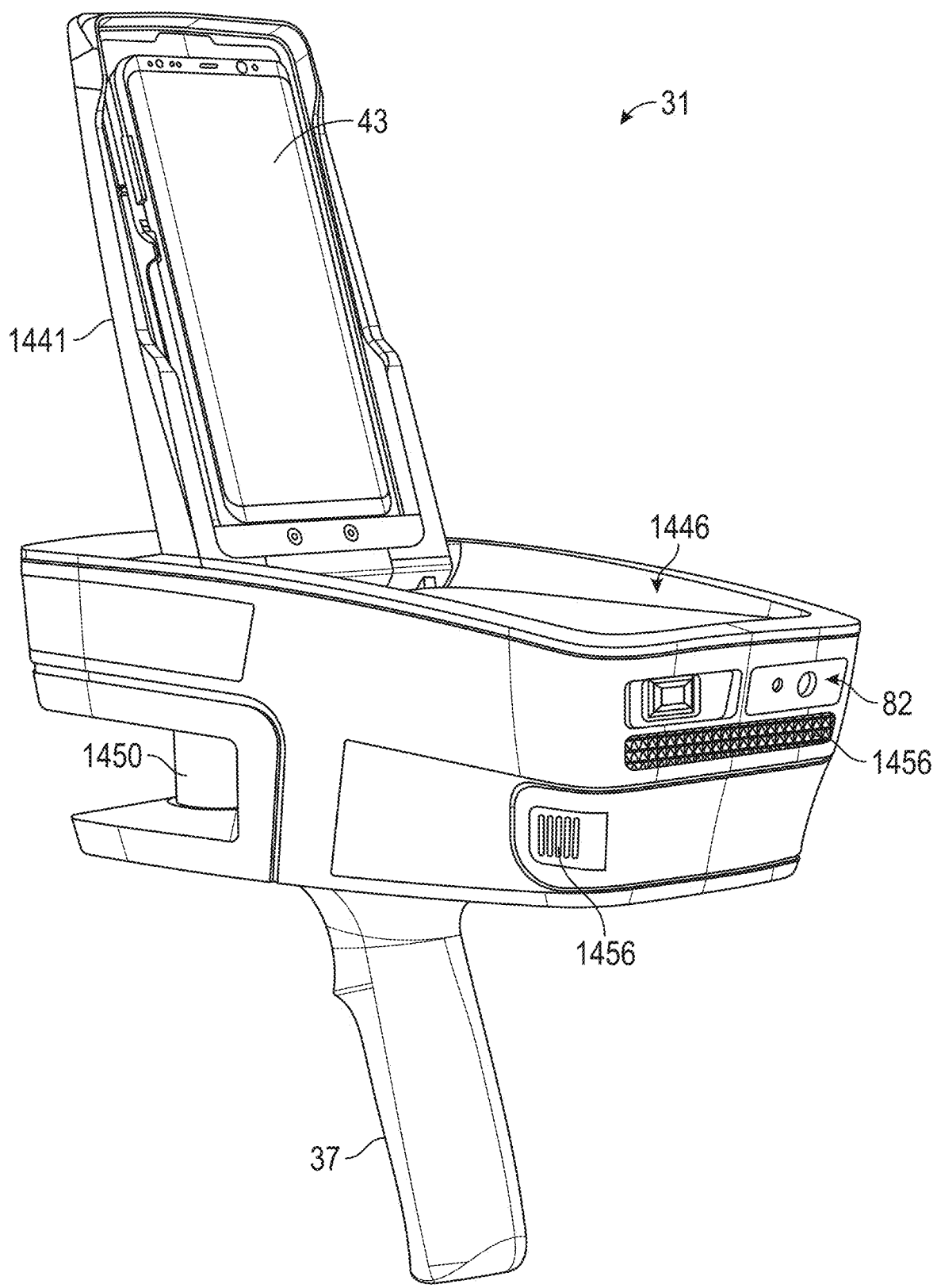

A FARO® ScanPlan device is an example of another type of measurement device that can be utilized by one or more embodiments of the present invention. Referring now to FIGS. 14-16, an embodiment of a system 31 having a housing 1432 that includes a body portion 1434 and a handle portion 37 is generally shown. In an embodiment, the handle 37 may include an actuator 39 that allows the operator to interact with the system 31. In the exemplary embodiment, the body 1434 includes a generally rectangular center portion 35 with a slot 1440 formed in an end 1442. The slot 1440 is at least partially defined by a pair of walls 1444 that are angled towards a second end 1448. As will be discussed in more detail herein, a portion of a two-dimensional scanner 1450 is arranged between the walls 1444. The walls 1444 are angled to allow the scanner 1450 to operate by emitting a light over a large angular area without interference from the walls 1444. As will be discussed in more detail herein, the end 1442 may further include a three-dimensional camera or RGBD camera 1760.

Extending from the center portion 35 is a mobile device holder 1441. The mobile device holder 1441 is configured to securely couple a mobile device 43 to the housing 1432. The mobile device 43 may be implemented, for example, by user device 102 of FIG. 1. The holder 1441 may include one or more fastening elements, such as a magnetic or mechanical latching element for example, that couples the mobile device 43 to the housing 1432. In an embodiment, the mobile device 43 is coupled to communicate with a controller 68 (FIG. 10). The communication between the controller 68 and the mobile device 43 may be via any suitable communications medium, such as wired, wireless or optical communication mediums for example.

In the illustrated embodiment, the holder 1441 is pivotally coupled to the housing 1432, such that it may be selectively rotated into a closed position within a recess 1646. In an embodiment, the recess 1646 is sized and shaped to receive the holder 1441 with the mobile device 43 disposed therein.

In the exemplary embodiment, the second end 1448 includes a plurality of exhaust vent openings 1456. In an embodiment, shown in FIG. 17, the exhaust vent openings 1456 are fluidly coupled to intake vent openings 1758 arranged on a bottom surface 62 of center portion 35. The intake vent openings 1758 allow external air to enter a conduit 64 having an opposite opening 1766 (FIG. 17) in fluid communication with the hollow interior 67 of the body 1434. In an embodiment, the opening 1766 is arranged adjacent to a controller 68 which has one or more processors that is operable to perform the methods described herein. In an embodiment, the external air flows from the opening 1766 over or around the controller 68 and out the exhaust vent openings 1456.

The controller 68 is coupled to a wall 70 of body 1434. In an embodiment, the wall 70 is coupled to or integral with the handle 37. The controller 68 is electrically coupled to the 2D scanner 1450, the 3D camera 1760, a power source 72, an inertial measurement unit (IMU) 74, a laser line projector 76, and a haptic feedback device 77.

Figure 17:
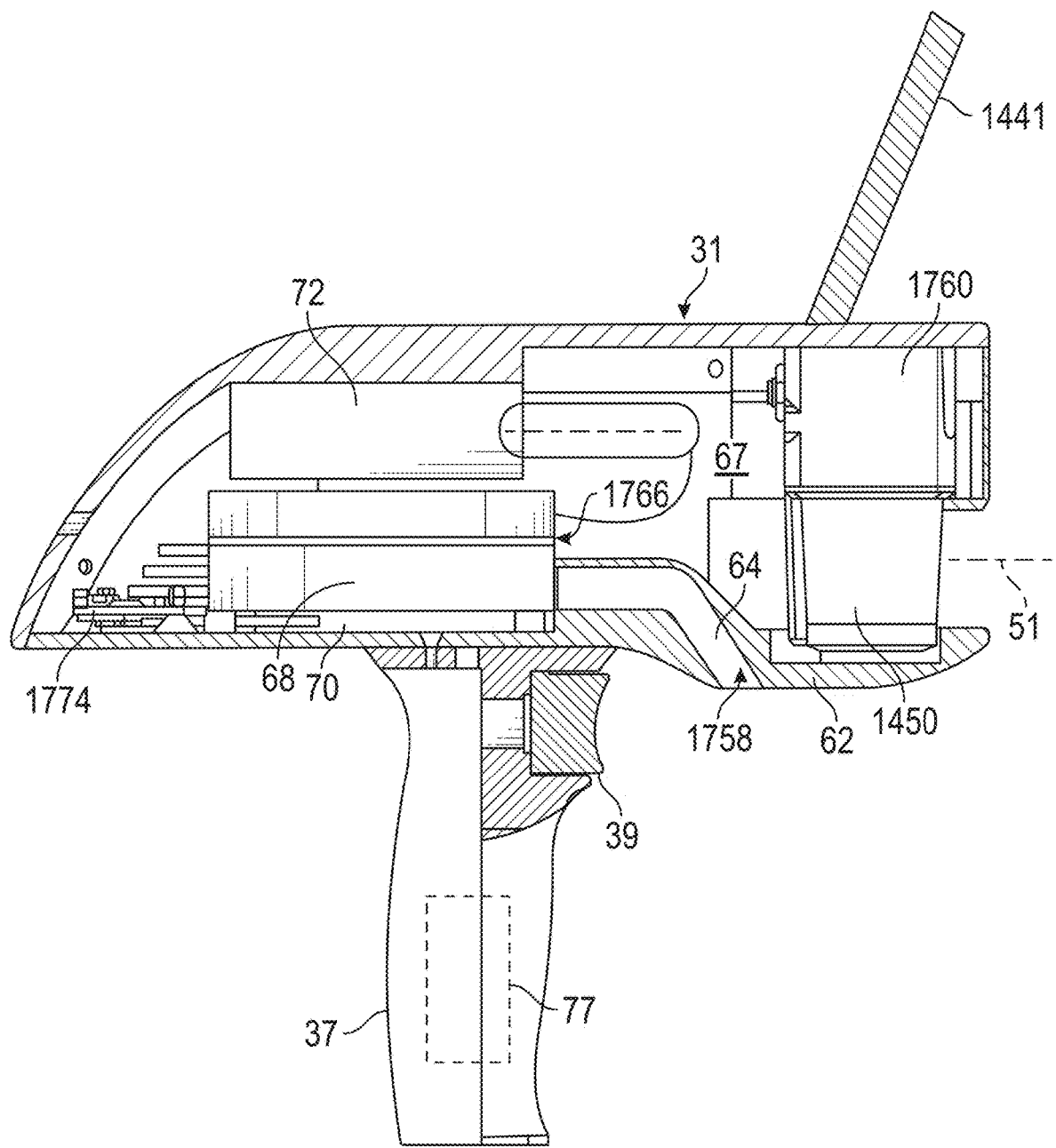
FIG. 17 is a side sectional view of the system of a scanning and mapping system in accordance with one or more embodiments of the present invention.
Figure 18:
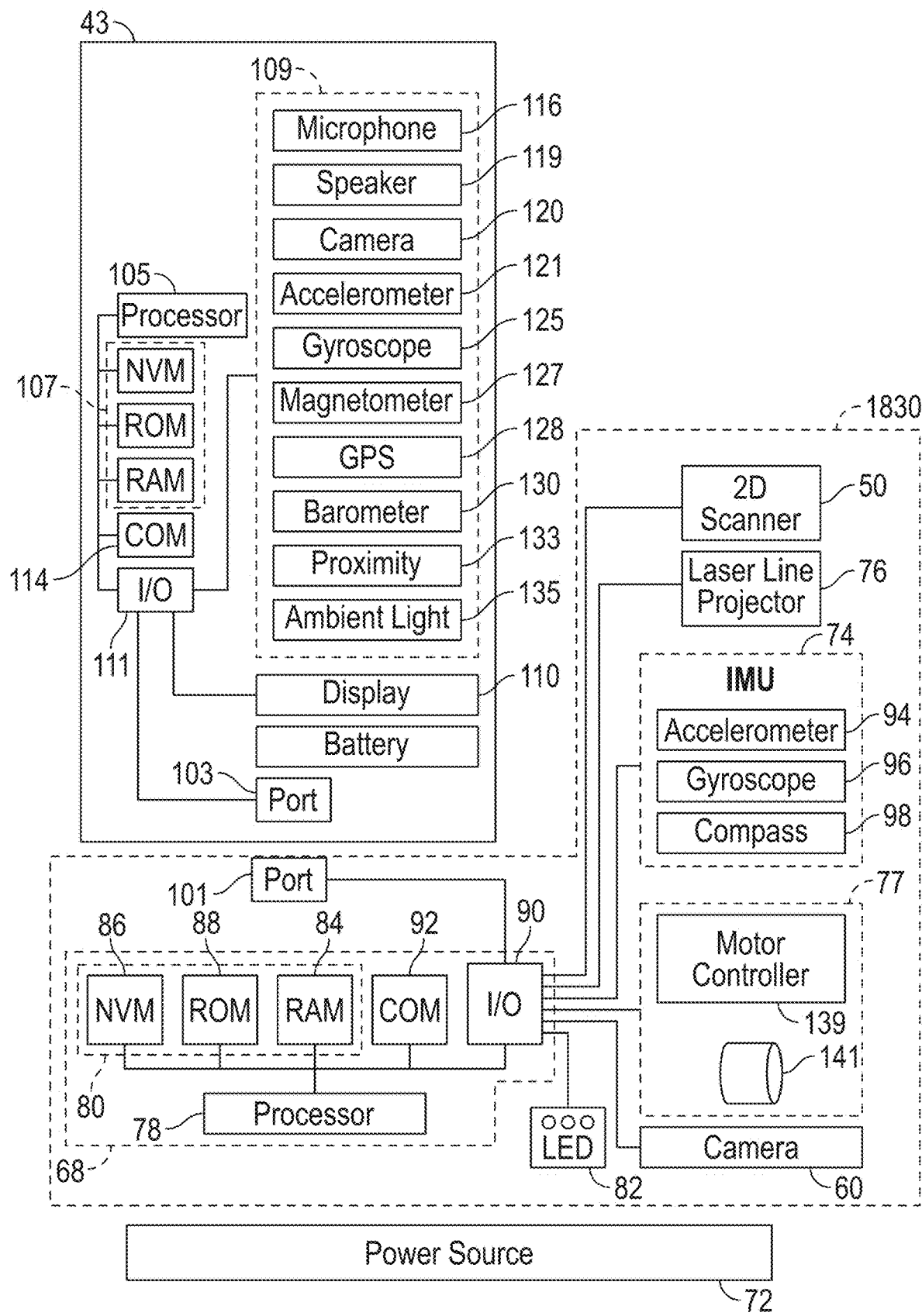
FIG. 18 is a block diagram of the systems of FIG. 14 and FIG. 17 in accordance with one or more embodiments of the present invention.

Referring now to FIG. 18 with continuing reference to FIGS. 14-17, elements are shown of the system 30 with the mobile device 43 installed or coupled to the housing 1432. Controller 68 is a suitable electronic device capable of accepting data and instructions, executing the instructions to process the data, and presenting the results. The controller 68 includes one or more processing elements 78. The processors may be microprocessors, field programmable gate arrays (FPGAs), digital signal processors (DSPs), and generally any device capable of performing computing functions. The one or more processors 78 have access to memory 80 for storing information.

Controller 68 is capable of converting the analog voltage or current level provided by 2D scanner 1450, camera 1760 and IMU 74 into a digital signal to determine a distance from the system 30 to an object in the environment. In an embodiment, the camera 1760 is a 3D or RGBD type camera. Controller 68 uses the digital signals that act as input to various processes for controlling the system 30. The digital signals represent one or more system 30 data including but not limited to distance to an object, images of the environment, acceleration, pitch orientation, yaw orientation and roll orientation. As will be discussed in more detail, the digital signals may be from components internal to the housing 1432 or from sensors and devices located in the mobile device 43.

In general, when the mobile device 43 is not installed, controller 68 accepts data from 2D scanner 1450 and IMU 74 and is given certain instructions for the purpose of generating a two-dimensional map of a scanned environment. Controller 68 provides operating signals to the 2D scanner 1450, the camera 1760, laser line projector 76 and haptic feedback device 77. Controller 68 also accepts data from IMU 74, indicating, for example, whether the operator is operating in the system in the desired orientation. The controller 68 compares the operational parameters to predetermined variances (e.g. yaw, pitch or roll thresholds) and if the predetermined variance is exceeded, generates a signal that activates the haptic feedback device 77. The data received by the controller 68 may be displayed on a user interface coupled to controller 68. The user interface may be one or more LEDs (light-emitting diodes) 82, an LCD (liquid-crystal diode) display, a CRT (cathode ray tube) display, or the like. A keypad may also be coupled to the user interface for providing data input to controller 68. In one embodiment, the user interface is arranged or executed on the mobile device 43.

The controller 68 may also be coupled to external computer networks such as a local area network (LAN) and the Internet. A LAN interconnects one or more remote computers, which are configured to communicate with controller 68 using a well-known computer communications protocol such as TCP/IP (Transmission Control Protocol/Internet(^) Protocol), RS-232, ModBus, and the like. Additional systems 30 may also be connected to LAN with the controllers 68 in each of these systems 30 being configured to send and receive data to and from remote computers and other systems 30. The LAN may be connected to the Internet. This connection allows controller 68 to communicate with one or more remote computers connected to the Internet.

The processors 78 are coupled to memory 80. The memory 80 may include random access memory (RAM) device 84, a non-volatile memory (NVM) device 86, a read-only memory (ROM) device 88. In addition, the processors 78 may be connected to one or more input/output (I/O) controllers 90 and a communications circuit 92. In an embodiment, the communications circuit 92 provides an interface that allows wireless or wired communication with one or more external devices or networks, such as the LAN discussed above.

Controller 68 includes operation control methods embodied in application code shown. These methods are embodied in computer instructions written to be executed by processors 78, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (HyperText Markup Language), Python, Ruby and any combination or derivative of at least one of the foregoing.

Coupled to the controller 68 is the 2D scanner 1450. The 2D scanner 1450 measures 2D coordinates in a plane. In the exemplary embodiment, the scanning is performed by steering light within a plane to illuminate object points in the environment. The 2D scanner 1450 collects the reflected (scattered) light from the object points to determine 2D coordinates of the object points in the 2D plane. In an embodiment, the 2D scanner 1450 scans a spot of light over an angle while at the same time measuring an angle value and corresponding distance value to each of the illuminated object points.

Examples of 2D scanners 1450 include, but are not limited to Model LMS100 scanners manufactured by Sick, Inc of Minneapolis, Minn. and scanner Models URG-04LX-UG01 and UTM-30LX manufactured by Hokuyo Automatic Co., Ltd of Osaka, Japan. The scanners in the Sick LMS100 family measure angles over a 270 degree range and over distances up to 20 meters. The Hoyuko model URG-04LX-UG01 is a low-cost 2D scanner that measures angles over a 240 degree range and distances up to 4 meters. The Hoyuko model UTM-30LX is a 2D scanner that measures angles over a 270 degree range and to distances up to 30 meters. It should be appreciated that the above 2D scanners are exemplary and other types of 2D scanners are also available.

In an embodiment, the 2D scanner 1450 is oriented so as to scan a beam of light over a range of angles in a generally horizontal plane (relative to the floor of the environment being scanned). At instants in time the 2D scanner 1450 returns an angle reading and a corresponding distance reading to provide 2D coordinates of object points in the horizontal plane. In completing one scan over the full range of angles, the 2D scanner returns a collection of paired angle and distance readings. As the system 30 is moved from place to place, the 2D scanner 1450 continues to return 2D coordinate values. These 2D coordinate values are used to locate the position of the system 30 thereby enabling the generation of a two-dimensional map or floorplan of the environment.

Also coupled to the controller 86 is the IMU 74. The IMU 74 is a position/orientation sensor that may include accelerometers 94 (inclinometers), gyroscopes 96, a magnetometers or compass 98, and altimeters. In the exemplary embodiment, the IMU 74 includes multiple accelerometers 94 and gyroscopes 96. The compass 98 indicates a heading based on changes in magnetic field direction relative to the earth's magnetic north. The IMU 74 may further have an altimeter that indicates altitude (height). An example of a widely used altimeter is a pressure sensor. By combining readings from a combination of position/orientation sensors with a fusion algorithm that may include a Kalman filter, relatively accurate position and orientation measurements can be obtained using relatively low-cost sensor devices. In the exemplary embodiment, the IMU 74 determines the pose or orientation of the system 30 about three-axis to allow a determination of a yaw, roll and pitch parameter.

In the embodiment shown in FIG. 17, the system 30 further includes a camera 1760 that is a 3D or RGB-D camera. As used herein, the term 3D camera refers to a device that produces a two-dimensional image that includes distances to a point in the environment from the location of system 30. The 3D camera 1760 may be a range camera or a stereo camera. In an embodiment, the 3D camera 1760 includes an RGB-D sensor that combines color information with a per-pixel depth information. In an embodiment, the 3D camera 1760 may include an infrared laser projector, a left infrared camera, a right infrared camera, and a color camera. In an embodiment, the 3D camera 1760 is a RealSense™ camera model R200 manufactured by Intel Corporation.

In an embodiment, when the mobile device 43 is coupled to the housing 1432, the mobile device 43 becomes an integral part of the system 30. In an embodiment, the mobile device 43 is a cellular phone, a tablet computer or a personal digital assistant (PDA). The mobile device 43 may be coupled for communication via a wired connection, such as ports 101, 103. The port 101 is coupled for communication to the processor 78, such as via I/O controller 90 for example. The ports 101, 103 may be any suitable port, such as but not limited to USB, USB-A, USB-B, USB-C, IEEE 1394 (Firewire), or Lightning™ connectors.

The mobile device 43 is a suitable electronic device capable of accepting data and instructions, executing the instructions to process the data, and presenting the results. The mobile device 43 includes one or more processing elements 105. The processors may be microprocessors, field programmable gate arrays (FPGAs), digital signal processors (DSPs), and generally any device capable of performing computing functions. The one or more processors 105 have access to memory 107 for storing information.

The mobile device 43 is capable of converting the analog voltage or current level provided by sensors 109 and processor 78. Mobile device 43 uses the digital signals that act as input to various processes for controlling the system 30. The digital signals represent one or more system 30 data including but not limited to distance to an object, images of the environment, acceleration, pitch orientation, yaw orientation, roll orientation, global position, ambient light levels, and altitude for example.

In general, mobile device 43 accepts data from sensors 109 and is given certain instructions for the purpose of generating or assisting the processor 78 in the generation of a two-dimensional map or three-dimensional map of a scanned environment. Mobile device 43 provides operating signals to the processor 78, the sensors 109 and a display 110. Mobile device 43 also accepts data from sensors 109, indicating, for example, to track the position of the mobile device 43 in the environment or measure coordinates of points on surfaces in the environment. The mobile device 43 compares the operational parameters to predetermined variances (e.g. yaw, pitch or roll thresholds) and if the predetermined variance is exceeded, may generate a signal. The data received by the mobile device 43 may be displayed on display 110. In an embodiment, the display 110 is a touch screen device that allows the operator to input data or control the operation of the system 30.

The controller 68 may also be coupled to external networks such as a local area network (LAN), a cellular network and the Internet. A LAN interconnects one or more remote computers, which are configured to communicate with controller 68 using a well-known computer communications protocol such as TCP/IP (Transmission Control Protocol/Internet(ˆ) Protocol), RS-232, ModBus, and the like. Additional systems 30 may also be connected to LAN with the controllers 68 in each of these systems 30 being configured to send and receive data to and from remote computers and other systems 30. The LAN may be connected to the Internet. This connection allows controller 68 to communicate with one or more remote computers connected to the Internet.

The processors 105 are coupled to memory 107. The memory 107 may include random access memory (RAM) device, a non-volatile memory (NVM) device, and a read-only memory (ROM) device. In addition, the processors 105 may be connected to one or more input/output (I/O) controllers 111 and a communications circuit 114. In an embodiment, the communications circuit 114 provides an interface that allows wireless or wired communication with one or more external devices or networks, such as the LAN or the cellular network discussed above.

Controller 68 includes operation control methods embodied in application code shown or described with reference to FIGS. 11-14 and FIG. 18. These methods are embodied in computer instructions written to be executed by processors 78, 105, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, C#, Objective-C, Visual C++, Java, ALGOL (algorithmic language), BASIC (beginners all-purpose symbolic instruction code), visual BASIC, ActiveX, HTML (Hyper-Text Markup Language), Python, Ruby and any combination or derivative of at least one of the foregoing.

Also coupled to the processor 105 are the sensors 109. The sensors 109 may include but are not limited to: a microphone 116; a speaker 119; a front or rear facing camera 120; accelerometers 121 (inclinometers), gyroscopes 125, a magnetometers or compass 127; a global positioning satellite (GPS) module 128; a barometer 130; a proximity sensor 133 134; and an ambient light sensor 135. By combining readings from a combination of sensors 109 with a fusion algorithm that may include a Kalman filter, relatively accurate position and orientation measurements can be obtained.

It should be appreciated that the sensors 1760, 1774 integrated into the scanner 1830 may have different characteristics than the sensors 109 of mobile device 43. For example, the resolution of the cameras 1760, 120 may be different, or the accelerometers 94, 121 may have different dynamic ranges, frequency response, sensitivity (mV/g) or temperature parameters (sensitivity or range). Similarly, the gyroscopes 96, 125 or compass/magnetometer may have different characteristics. It is anticipated that in some embodiments, one or more sensors 109 in the mobile device 43 may be of higher accuracy than the corresponding sensors 1774 in the system 30. As described in more detail herein, in some embodiments the processor 78 determines the characteristics of each of the sensors 109 and compares them with the corresponding sensors in the system 30 when the mobile device. The processor 78 then selects which sensors 1774, 109 are used during operation. In some embodiments, the mobile device 43 may have additional sensors (e.g. microphone 116, camera 120) that may be used to enhance operation compared to operation of the system 30 without the mobile device 43. In still further embodiments, the system 30 does not include the IMU 74 and the processor 78 uses the sensors 109 for tracking the position and orientation/pose of the system 30. In still further embodiments, the addition of the mobile device 43 allows the system 30 to utilize the camera 120 to perform three-dimensional (3D) measurements either directly (using an RGB-D camera) or using photogrammetry techniques to generate 3D maps. In an embodiment, the processor 78 uses the communications circuit (e.g. a cellular 4G internet connection) to transmit and receive data from remote computers or devices.

In the exemplary embodiment, the system 30 is a handheld portable device that is sized and weighted to be carried by a single person during operation. Therefore, the plane in which the 2D scanner 1450 projects a light beam may not be horizontal relative to the floor or may continuously change as the computer moves during the scanning process. Thus, the signals generated by the accelerometers 94, gyroscopes 96 and compass 98 (or the corresponding sensors 109) may be used to determine the pose (yaw, roll, tilt) of the system 30 and determine the orientation of the plane 51.

In an embodiment, it may be desired to maintain the pose of the system 30 (and thus the plane) within predetermined thresholds relative to the yaw, roll and pitch orientations of the system 30. In an embodiment, a haptic feedback device 77 is disposed within the housing 1432, such as in the handle 37. The haptic feedback device 77 is a device that creates a force, vibration or motion that is felt or heard by the operator. The haptic feedback device 77 may be, but is not limited to: an eccentric rotating mass vibration motor or a linear resonant actuator for example. The haptic feedback device is used to alert the operator that the orientation of the light beam from 2D scanner 1450 is equal to or beyond a predetermined threshold. In operation, when the IMU 74 measures an angle (yaw, roll, pitch or a combination thereof), the controller 68 transmits a signal to a motor controller 139 that activates a vibration motor 141. Since the vibration originates in the handle 37, the operator will be notified of the deviation in the orientation of the system 30. The vibration continues until the system 30 is oriented within the predetermined threshold or the operator releases the actuator 39. In an embodiment, it is desired for the plane to be within 10-15 degrees of horizontal (relative to the ground) about the yaw, roll and pitch axes.

It will be appreciated that aspects of the present invention may be embodied as a system, method, or computer program product and may take the form of a hardware embodiment, a software embodiment (including firmware, resident software, micro-code, etc.), or a combination thereof. Furthermore, aspects of the present invention may take the form of a computer program product embodied in one or more computer readable medium(s) having computer readable program code embodied thereon.

One or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In one aspect, the computer readable storage medium may be a tangible medium containing or storing a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

The computer readable medium may contain program code embodied thereon, which may be transmitted using any appropriate medium, including but not limited to wireless, wireline, optical fiber cable, RF, etc., or any suitable combination of the foregoing. In addition, computer program code for carrying out operations for implementing aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

It will be appreciated that aspects of the present invention are described herein with reference to flowchart illustrations and/or block diagrams of methods, apparatus (systems) and computer program products according to embodiments of the invention. It will be understood that each block or step of the flowchart illustrations and/or block diagrams, and combinations of blocks or steps in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed general purpose computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, digital CPU devices, GPU devices, computing devices, microcontrollers, digital signal processors (DSPs), field programmable gate arrays (FPGAs), or like devices, as further described herein. A CPU typically performs a variety of tasks while a GPU is optimized to display or process images and/or 3D datasets.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

Terms such as processor, controller, computer, DSP, FPGA are understood in this document to mean a computing device that may be located within an instrument, distributed in multiple elements throughout an instrument, or placed external to an instrument.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The term "about" is intended to include the degree of error associated with measurement of the particular quantity based upon the equipment available at the time of filing the application. For example, "about" can include a range of ±8% or 5%, or 2% of a given value.

What is claimed is:

1. A system for providing a distributed measurement system, the system comprising:
   a memory having computer readable instructions; and
   one or more processors for executing the computer readable instructions, the computer readable instructions controlling the one or more processors to perform operations comprising:
   receiving, via a user interface of a user device, a request to access a data file of a project, the project comprising a plurality of data files including the data file, at least one of the plurality of data files comprising point cloud data generated based at least in part on measurement data output from a measurement device;
   providing one or more editing options for editing the data file, wherein the one or more editing options vary based at least in part on one or both of a characteristic of the user device and a characteristic of the data file, wherein the characteristic of the data file includes a density of the data file when the data file comprises point cloud data; and editing the data file in response to receiving an editing request that includes an editing option of the one or more editing options.

2. The system of claim 1, wherein the measurement device includes a scanner and the measurement data includes scan data.

3. The system of claim 1, wherein the editing options further vary based at least in part on a location of a processor executing an application performing the receiving, providing and editing.

4. The system of claim 1, wherein the operations further comprise retrieving the data file and displaying contents of the data file via the user interface.

5. The system of claim 1, wherein the operations further comprise storing the data file in a storage location on the user device.

6. The system of claim 1, wherein the operations further comprise storing the data file in a cloud storage location.

7. The system of claim 1, wherein the operations further comprise further comprising transmitting the data file to another user device.

8. The system of claim 1, wherein the user device includes a camera and the editing option includes adding an image to the data file.

9. The system of claim 1, wherein the user device includes an inertial measurement unit, and the editing option includes identifying a position of the user device.

10. A method of providing a distributed measurement system, the method comprising:
    receiving, via a user interface of a user device, a request to access a data file of a project, the project comprising a plurality of data files including the data file, at least one of the plurality of data files comprising point cloud data generated based at least in part on measurement data output from a measurement device;
    providing one or more editing options for editing the data file, wherein the one or more editing options vary based at least in part on one or both of a characteristic of the user device and a characteristic of the data file, wherein the characteristic of the data file includes a density of the data file when the data file comprises point cloud data; and
    editing the data file in response to receiving an editing request that includes an editing option of the one or more editing options.

11. The method of claim 10, wherein the measurement device includes a scanner and the measurement data includes scan data.

12. The method of claim 10, wherein the editing options further vary based at least in part on a location of a processor executing an application performing the receiving, providing and editing.

13. The method of claim 10, further comprising retrieving the data file and displaying contents of the data file via the user interface.

14. The method of claim 10, further comprising storing the data file in a storage location on the user device.

15. The method of claim 10, further comprising storing the data file in a cloud storage location.

16. The method of claim 10, further comprising transmitting the data file to another user device.

17. A computer program product for providing a distributed measurement system, the computer program product comprising a computer readable storage medium having program instructions embodied therewith, the program instructions executable by a processor to cause the processor to perform operations comprising:
    receiving, via a user interface of a user device, a request to access a data file of a project, the project comprising a plurality of data files including the data file, at least one of the plurality of data files comprising point cloud data generated based at least in part on measurement data output from a measurement device;
    providing one or more editing options for editing the data file, wherein the one or more editing options vary based at least in part on one or both of a characteristic of the user device and a characteristic of the data file, wherein the characteristic of the data file includes a density of the data file when the data file comprises point cloud data; and
    editing the data file in response to receiving an editing request that includes an editing option of the one or more editing options.

18. The computer program product of claim 17, wherein the measurement device includes a scanner and the measurement data includes scan data.

\* \* \* \* \*